United States Patent [19]

Hruska

[11] Patent Number: 4,785,159

[45] Date of Patent: Nov. 15, 1988

[54] DENTAL WELDING DEVICE AND SYSTEM

[75] Inventor: Arturo Hruska, Rome, Italy

[73] Assignee: Titanweld B.V., Amsterdam, Netherlands

[21] Appl. No.: 49,602

[22] Filed: May 14, 1987

Related U.S. Application Data

[63] Continuation-in-part of Ser. No. 711,100, Mar. 13, 1985.

[51] Int. Cl.⁴ .............................................. B23K 11/26
[52] U.S. Cl. ..................................... 219/111; 219/113
[58] Field of Search ................ 219/108, 110, 111, 113

[56] References Cited

U.S. PATENT DOCUMENTS

| | | | |
|---|---|---|---|
| 4,104,724 | 8/1978 | Dix et al. | 219/108 |
| 4,456,809 | 6/1984 | Jones et al. | 219/108 |
| 4,681,999 | 7/1987 | Hruska | 219/111 |

Primary Examiner—Clifford C. Shaw
Attorney, Agent, or Firm—John J. Byrne

[57] ABSTRACT

A precision electric welding device is used for welding dental crowns and bridges in the mouth. The dental elements to be welded comprise dentally suitable metals, especially titanium and titanium alloys. The device comprises a welding gun and a base unit provided with a direct current voltage source and a storage device for storing welding sequences. Each welding sequence defines the energy requirements for successive pulses in a particular welding operation. The base unit generates a series of controlled voltage potentials for each operation, and the welding gun is responsive thereto for performing the welding operations. The portable welding system is of the capacity-discharge, contact-resistance type, and performs welding with high-precision endo-oral metals by generating controlled sequences of electrical energy pulses (1) selected from a permanent storage library, or (2) manually controlled from a local console, or (3) externally controlled from an external computer. The permanent storage library can store a plurality of (e.g., up to 256) three-pulse welding sequences written to it in the "manual" mode of operation.

19 Claims, 13 Drawing Sheets

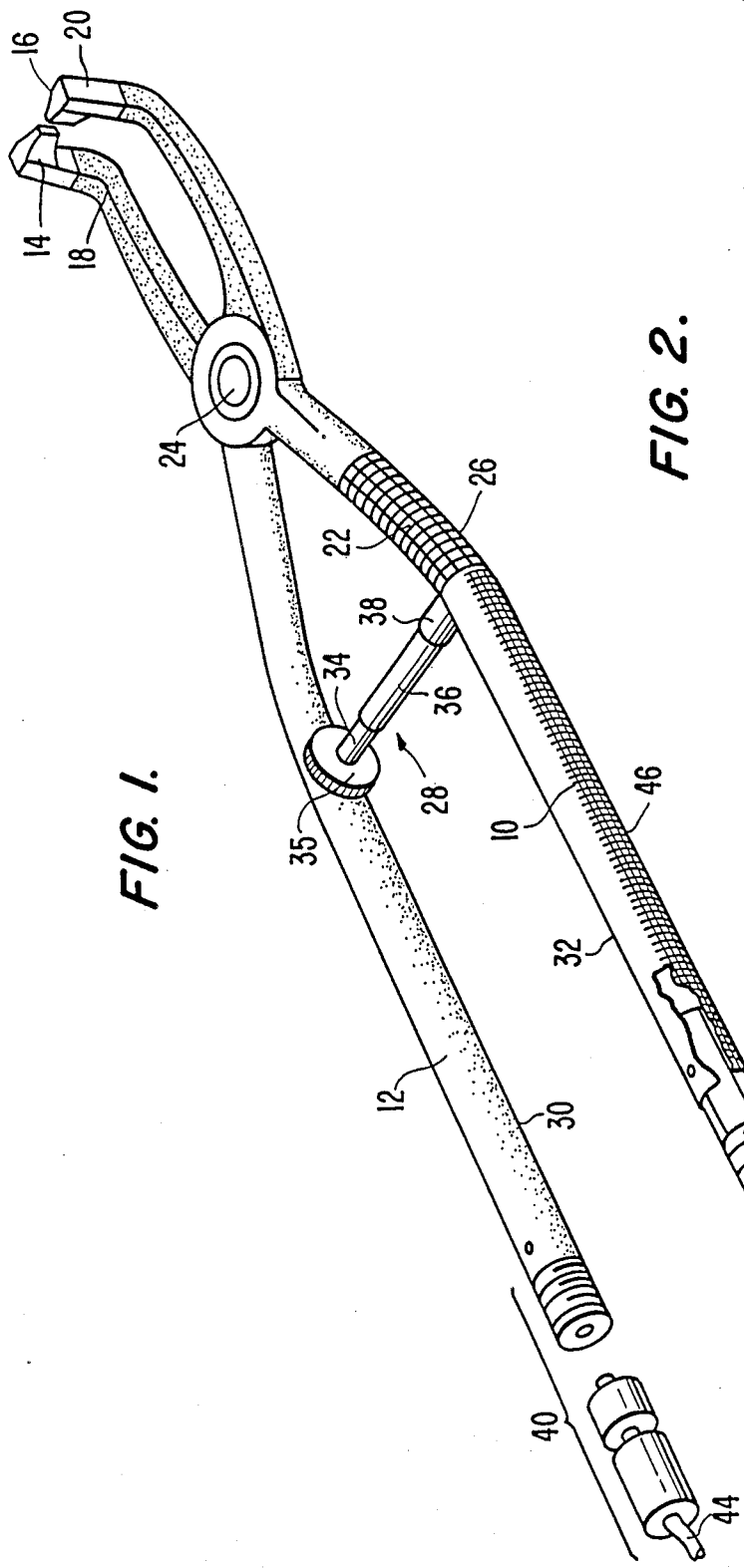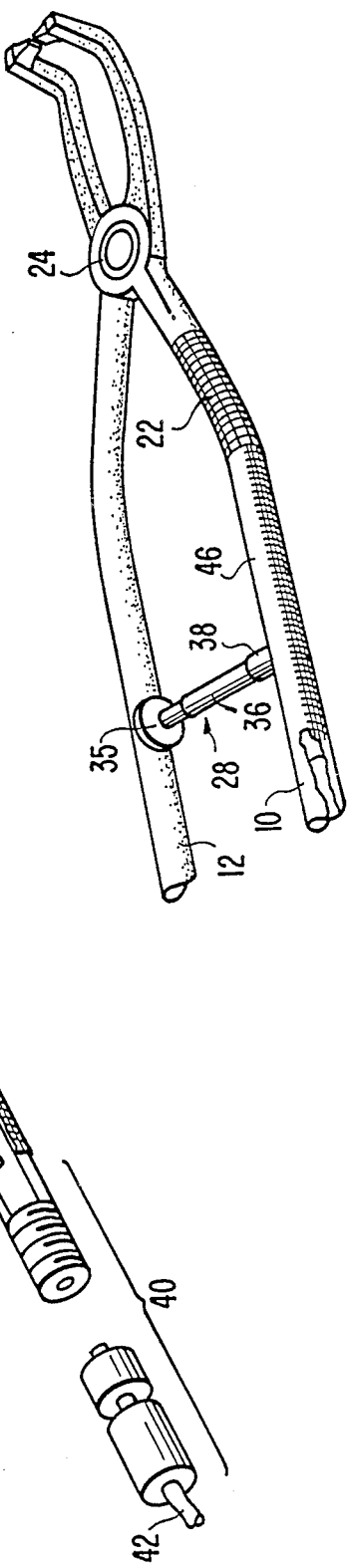

4,785,159

DENTAL WELDING DEVICE AND SYSTEM

REFERENCE TO RELATED APPLICATION

This is a continuation-in-part (CIP) of Ser. No. 711,100, filed on Mar. 13, 1985.

TECHNICAL FIELD

This invention relates to a precision electric welding device and system for welding dental elements including crowns and bridges in the mouth. The elements are made up of dentally suitable metals, especially titanium and titanium alloys. The welding device comprises in combination a precision electric welding gun and an electronic welding base unit connected thereto. The base unit is operative to provide a series of controlled voltage potentials to the welding gun, which potentials vary in magnitude in accordance with specific requirements of particular welding tasks. The welding gun makes actual contact with the dental elements to be welded, and applies voltage across the dental elements in accordance with the controlled voltage potentials supplied thereto by the base unit.

The invention also relates to a capacity-discharge, contact-resistance-type, portable welding machine or system designed for welding with high-precision endo-oral metals. The system is used to generate controlled sequences of electrical energy pulses which are (1) selected from a permanent stored library of up to 256 three-pulse welding sequences, or (2) manually controlled from a local control panel to test the best welding sequence for a particular welding operation, or (3) externally controlled through an interface connector by an external welding control computer. Other features include the storage of tested welded sequences (see item (2) above) so that the best sequence can be retrieved subsequently, and the provision of an internal battery for battery-powered operation so as to provide safety during endo-oral surgery.

BACKGROUND ART

The problems encountered by past makers of welding devices of the type similar to that of the present invention are three-fold. The first relates to the operation of the precision welding gun, the second relates to the operation of the capacitive discharge welding base unit, and the third relates to the need for a system capable of storing, retrieving and repeating optimum welding sequences.

Regarding the precision welding gun, an example of prior art welding guns is the electroholder gun described in Italian Patent No. 957,321 (Spinnato). In the Spinnato device, a helical spring is provided and forms a central fulcrum for its arms. The tips of the arms elastically engage and act so as to close the tips of the gun. The Spinnato structure does not permit the degree of sensitivity obtained by the device described herein.

Moreover, the Spinnato patent does not disclose the quick disconnect feature of this invention, either for its sterilization, or for the substitution of gun bearing electrodes capable of satisfying different welding requirements. The gun according to the present invention satisfies this requirement, as well as other requirements.

Regarding the welding base unit, prior art devices include electric welding machines such as that disclosed and illustrated in Italian Patent No. 957,322 (Spinnato). Spinnato's machine operates on alternating current, and thus can be supplied only by network voltage, and it must be manually adapted for each individual operation so as to be tailored to specific conditions of each welding task. Prior to operation, the setting or adaptation of the device requires experimentation with a model in a test mode to ensure proper operation of the device in the real mode. Such preliminary checks are required because of possible changes in the network voltage supply and because of differences in the thickness of the materials to be welded as it is impossible to adjust the pressure of the welding gun employed with such welding devices in operation.

Prior art welding systems suffer the basic defect of poor repeatability of processes or welding sequences, thus making such systems ineffective or not useful for medical endo-oral applications. Thus, such systems need the capabilities of evaluating, permanently storing and repeating (if appropriate) welding sequences so that the welding sequences used are optimized in accordance with the type of metals and alloys used for welding, the form of the welded elements, and surface characteristics.

DISCLOSURE OF INVENTION

The device for welding dental elements in accordance with the present invention comprises an interdental precision electric welding gun (as disclosed in Italian Patent Application No. 48425A/84) which is suitable for carrying our welding operations in the mouth with any dentally compatible metal, especially with titanium or titanium alloys, for making bridges through the welding of preformed crowns provided with tabs (such as those disclosed in Italian Patent Application No. 48426A/84). The welding gun of the present invention has structural and functional features that permit an optimal sensitivity in the grip of the user and the parts to be welded, and that provide a capacity to preadjust the pressure exerted on the parts and to rapidly replace the gun with another similar gun provided with differently shaped electrodes.

The welding base unit of the present invention eliminates the aforementioned inconveniences and difficulties in prior art arrangements. The base unit is free of any problem caused by voltage oscillations, and is also free of risks to the operator caused by insulation losses relative to network voltage supply because it is supplied by a direct current voltage source. Such a voltage source may be an accumulator or a storage battery, and can be implemented by various electronic components. The present invention also makes use of electronic memory storage elements in which respective energy requirements of successive voltage pulses in a welding operation are stored for subsequent retrieval and execution upon operator selection and activation. The voltage potential and energy specifically relate to welding operations as a function of changes in the characteristics of the materials for welding, and in the thickness and other characteristics relating to welding gun pre-loads. In this manner, exact welding operations tailored to various kinds of welding conditions may be reliably reproduced upon operator selection of predetermined voltage pulse sequences, without the need for model experimentation. It is also possible to display or print out the successive sequence information of the entire welding operation.

A preferred experiment of the electronic welding base unit comprises a direct current voltage source, a memory for pre-storing sequences of voltage potential requirements tailored to specific welding conditions, charging circuitry for generating corresponding charges, a capacitor bench for maintaining said charge, and an electronic switch for applying a series of controlled voltage potentials of various magnitudes from the capacitor bench to the precision welding gun.

According to a preferred embodiment of the electric welding gun of this invention, the levers and the carriage spring are made of a Cu-Be alloy. The alloy is surface treated with a chromium plating to obtain a suitable equilibrium between the modulus of elasticity and mechanical strength so that the gun can be sterilized when disconnected.

According to another preferred embodiment of the invention, the gun carries its electrodeholder tips at an angle between 0° and 360° with respect to the horizontal plane of the gun, depending on the particular welding requirements. The electric welding gun, when used in the dental field for welding operations within the mouth, normally carries its tip at an angle between 90° and 120° with respect to the horizontal plane of the gun.

A preferred embodiment of the portable welding machine or system of the present invention basically comprises a high energy capacitor module, a control panel or console, a battery module, a weld clamping tool, control circuitry (preferably implemented on a printed circuit board), a weld-start control (preferably a foot-operated switch), and an electronic power switch (preferably implemented by a silicon-controlled rectifier or SCR). The control circuitry performs, among others, the functions of auxiliary power supply, capacitor charge control, analog-to-digital and digital-to-analog conversion, digital storage of welding sequences, and various timing and control functions.

Therefore, it is a primary object of the present invention to provide a precision welding device for welding dental elements in the mouth, which device does not require specific adaptation via model experimentation prior to each welding task in order to ensure reliable reproduction of the desired effects.

It is an additional object of the present invention to provide a series of controlled voltage potentials from a capacitive discharge welding base unit to a precision electric welding gun by employing a direct current voltage source.

It is an additional object of the present invention to provide a welding device for welding dental elements in the mouth, which device makes use of pre-stored sequences of voltage pulse data tailored to specific welding conditions to generate a series of controlled voltage potentials in accordance therewith.

It is an additional object of the present invention to enable an operator to select a desired sequence of welding pulse requirements from one of many such pre-stored sequences.

It is an additional object of the present invention to facilitate the changing of voltage potential pulse requirements from one welding condition to another.

It is an additional object of the present invention to provide a precision welding gun having the capability of adjusting the pressure on the parts to be welded by permitting the exertion of the desired constant pre-load pressure during welding by the electrodes as a result of the presence of a carriage spring and adjustment device.

It is a further object of the present invention to provide an electric welding gun having the capability of rapid engagement and disengagement of the cables from the welding machine power supply so that the gun can be readily and quickly replaced with another.

It is a further object of the present invention to provide an electric welding gun with prongs on which the electrodes are mounted at an angle with respect to the horizontal plane of the gun, the angle being advantageous for different welding requirements.

It is a further object of the present invention to provide a precision electric welding gun, particularly suitable for welding operations within the mouth, as well as in the orthopedic field, or for other surgical applications, the gun including conductive levers crossing toward their tips at an electrically insulating fulcrum device.

It is a further object of the present invention to provide an electric welding gun with replaceable electrodes at the tips of crossed levers and with a high precision adjustment device between the arms of the levers together with a carriage spring on one of the levers downstream of the adjustment device, the unit being lined with a conductive flexible cord that restores the electric conductivity of the arm of the lever having the carriage spring, the capability of rapid engagement/disengagement of the connector between the cables and the welding machine also being provided.

It is a further object of the present invention to provide a flexible cord conductor about the carriage spring of an electric welding gun.

It is a further object of the present invention to provide an electric welding gun that includes a high precision threaded rod on which a load adjusting disk is provided, an insulating body being provided on the opposite side of the disk to prevent electric current from passing from one lever to another.

It is a further object of the present invention to provide a capacity-discharge, contact-resistance-type, portable welding machine or system designed for welding with high-precision endo-oral metals.

It is a further object of the present invention to provide a portable welding machine or system which generates controlled sequences of electrical energy pulses as selected from a permanent stored library of multipulse welding sequences.

It is a further object of the present invention to provide a portable welding machine or system which generates controlled sequences of electrical energy pulses under manual control from a local control panel or console so as to test for the optimum welding sequence.

It is a further object of the present invention to provide a portable welding machine or system which generates controlled sequences of electrical energy pulses under external control by an external welding control computer.

It is a further object of the present invention to provide a portable welding machine or system which generates controlled sequences of electrical energy pulses using an internal battery so as to provide safety during endo-oral surgery.

Other objects and advantages of the present invention will become apparent from the following detailed description of preferred embodiments taken in conjunction with the accompanying drawings.

BRIEF DESCRIPTION OF DRAWINGS

FIG. 1 is a perspective view of one embodiment of an electric welding gun according to the present invention.

FIG. 2 is a perspective view of another embodiment of the welding gun according to the present invention.

BEST MODE FOR CARRYING OUT THE INVENTION

Figure 3:
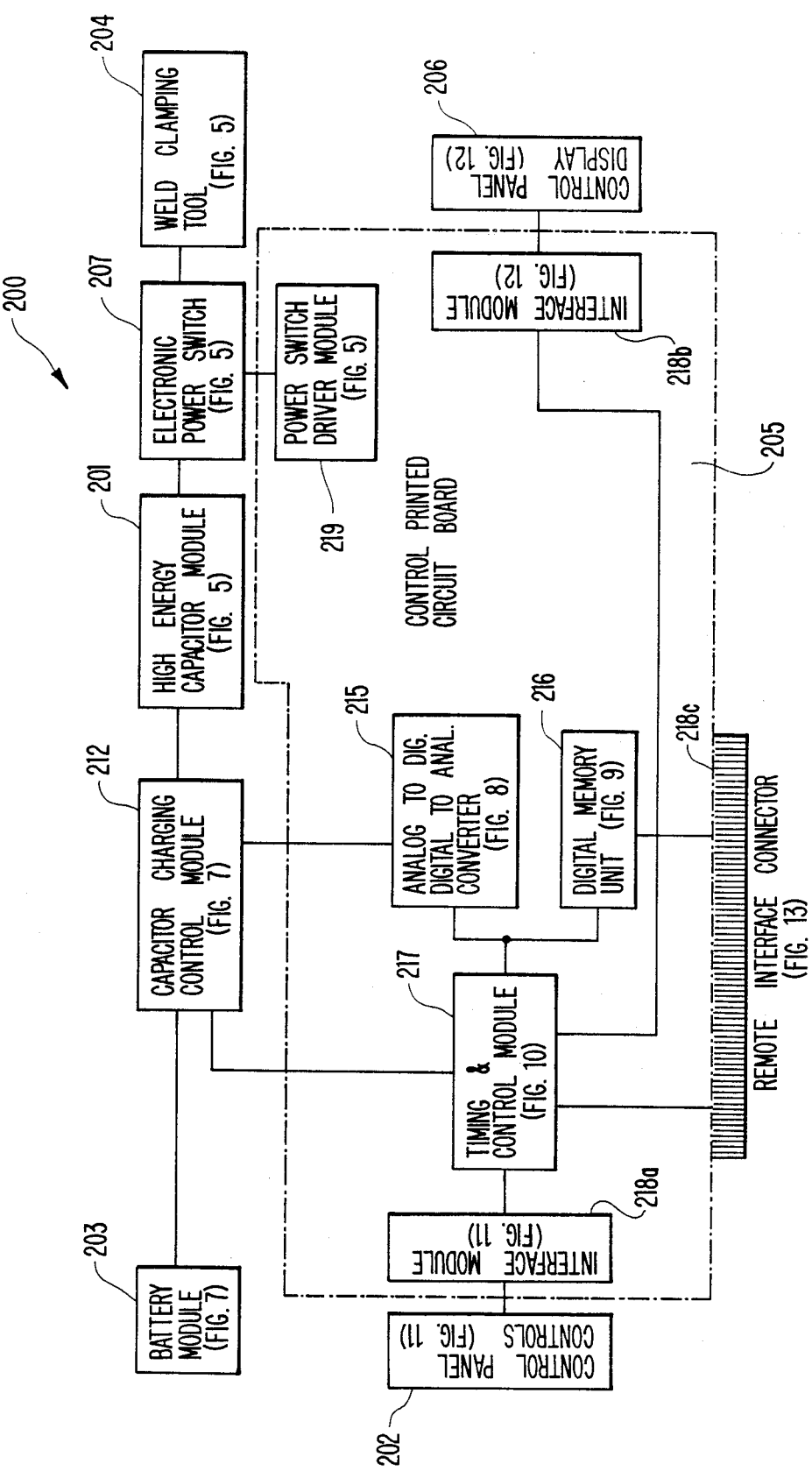
FIG. 3 is a block diagram of a welding system of the present invention.

Referring to the drawings wherein like numbers indicate like parts, FIGS. 1 and 2 are perspective views of the electric welding gun according to the present invention. In FIGS. 1 and 2, the arms or levers 10 and 12 of the electric welding gun are constructed of a Cu-Be alloy surface-treated by a chromium plating so that sterilization of the gun is facilitated. The employment of such an alloy gives the welding gun a high electrical conductivity as well as mechanical strength, whereby an optimal compromise is reached between the modulus of elasticity and mechanical strength.

Elconite electrodes 14 and 16 are secured at the outer ends of tips 18 and 20 of the levers 10 and 12. The tips are bent to approximately 90° with respect to the plane of the welding gun as defined by movement of the levers 10 and 12. This configuration is particularly suitable for welding operations within the mouth.

Intermediate the length of lever 10, a carriage spring 22 is provided. The spring 22 is located where the levers begin to coverge toward the fulcrum 24. The fulcrum 24 electrically insulates the lever 10 from the lever 12. A flexible copper lining 26 is provided about the carriage spring 22. The spring 22 is constructed of a Cu-Be alloy. The copper lining 26 restores the electrical conductivity of lever 10.

A pre-load adjusting device 28 extends between the handle sections 30 and 32 of levers 10 and 12, respectively. A threaded rotatable rod 34 having an operating disk 35 is received within a threaded member 36 so that precision adjustment by the user can be made with the thumb of the hand that holds the welding gun. The threaded member 36 is secured to the handle 10 by a non-conductive stud 38. This prevents current from flowing between the levers 10 and 12.

By means of the precision adjusting device 28, it is possible to exert a selected constant preloading during the welding operation as a result of the force exerted by the carriage spring 22.

A rapid engagement and disengagement device 40 is located at the ends of the handle sections. The cables 42 and 44 of the welding unit control and the power supply (not shown) can be rapidly connected and disconnected to allow for the rapid replacement of a welding gun of a given shape with a gun of a different shape.

The levers at the fulcrum 24 are coated with plastic or other non-conductive material so as to prevent any short-circuiting of the current levers 10 and 12. Additionally, all exterior elements of the gun, except the electrodes 14 and 16, are coated with a non-conductive coating indicated by the numeral 46.

In FIG. 2, a pre-load adjusting device 28 is located at a position between the straight sections of the levers 10 and 12.

In operation, the part or element to be welded is located between the electrodes 14 and 16. The disk or knob 35 is rotated until a desired pressure against the part is selected. Because of the carriage spring 26, this pressure has some resiliency and gives a "feel" to the gun user. After the welding has occurred, the pressure is released and a new weld can be performed. If the new weld requires a different size electrode or a different angle of tip with respect to the handles, the rapid engagement and disengagement device 40 can be used to quickly bring the new gun into action.

FIG. 3 is a block diagram of the welding system of the present invention. As seen therein, the system 200 comprises a high energy capacitor module 201, operator controls (on a control panel) 202, a battery module 203, a weld clamping tool 204, control circuitry in the form of a printed circuit board 205, a control panel display 206, an electronic power switch 207, and a capacitor charging control module 212. The control circuitry in the printed circuit board 205 includes converter circuitry 215 (including analog-to-digital and digital-to-analog converters), a digital memory unit 216, a timing and control module 217, interface modules 218a and 218b, remote interface connector 218c, and power switch driver module 219.

The high energy capacitor module 201 contains a low-impedance, high-energy, liquid-aluminum output capacitor arrangement in which electrical energy used in the formation of welding pulses is stored. This module is responsible for forming the large values of electrical current involved in the formation of welding pulses.

Controls 202 and display 206 provide operator controls and indicators necessary for mode selection and manual operation by the operator. As will be seen below, the system operates in a manner dependent on the mode status relative to four different modes of operation. The remote interface connector 218c provides the system with the capability of connection to a remote terminal or information source (even another system or computer), by means of which the present system is controlled insofar as its welding operations and welding sequence storage operations are concerned.

The battery module 203 contains batteries (preferably, a total battery voltage of 18 volts D.C.) which permit operation in full insulation from the main line system, thus providing an element of human safety. The weld clamping tool 204 is a special tool designed for constant and adjustable pressure on parts being welded so as to permit mechanical conditions to be repeated for best welding results. Whereas the present system is preferably employed with the special tool described above, the system can be employed in conjunction with any conventional weld clamping tool.

The control circuitry contained in printed circuit board 205 contains all relevant electronic control circuits for operation of the system. These elements will be described in more detail below in conjunction with a detailed description of the make-up and operation of the various components of the control circuitry 205.

The capacitor charging control module 212 provides controlled charging of the output capacitor or high energy capacitor module 201. This function is performed by employment of a serial regulator (also described below). The high energy capacitor module 201 is charged to a voltage level controlled by an input signal. As soon as the capacitor module 201 is charged to a predetermined voltage value, welding takes place by means of activation of the electronic power switch 207 via the power switch driver module 219 in control circuitry 205.

As will be described in more detail below, digital memory unit 216 is capable of storing a plurality of three-pulse welding sequences in digital form, either as a result of direct digital transfer via the interface connector 218c from an external computer, or as a result of test application of such welding sequences by the operator, the test welding sequences being converted to digital form in converter 215 prior to storage in digital memory unit 216. Subsequently, such stored welding sequences can be retrieved from digital memory unit 216, converted to analog form in converter 215, and applied to the capacitor charging control module 212 so as to reapply the stored welding sequences.

Figure 4A:
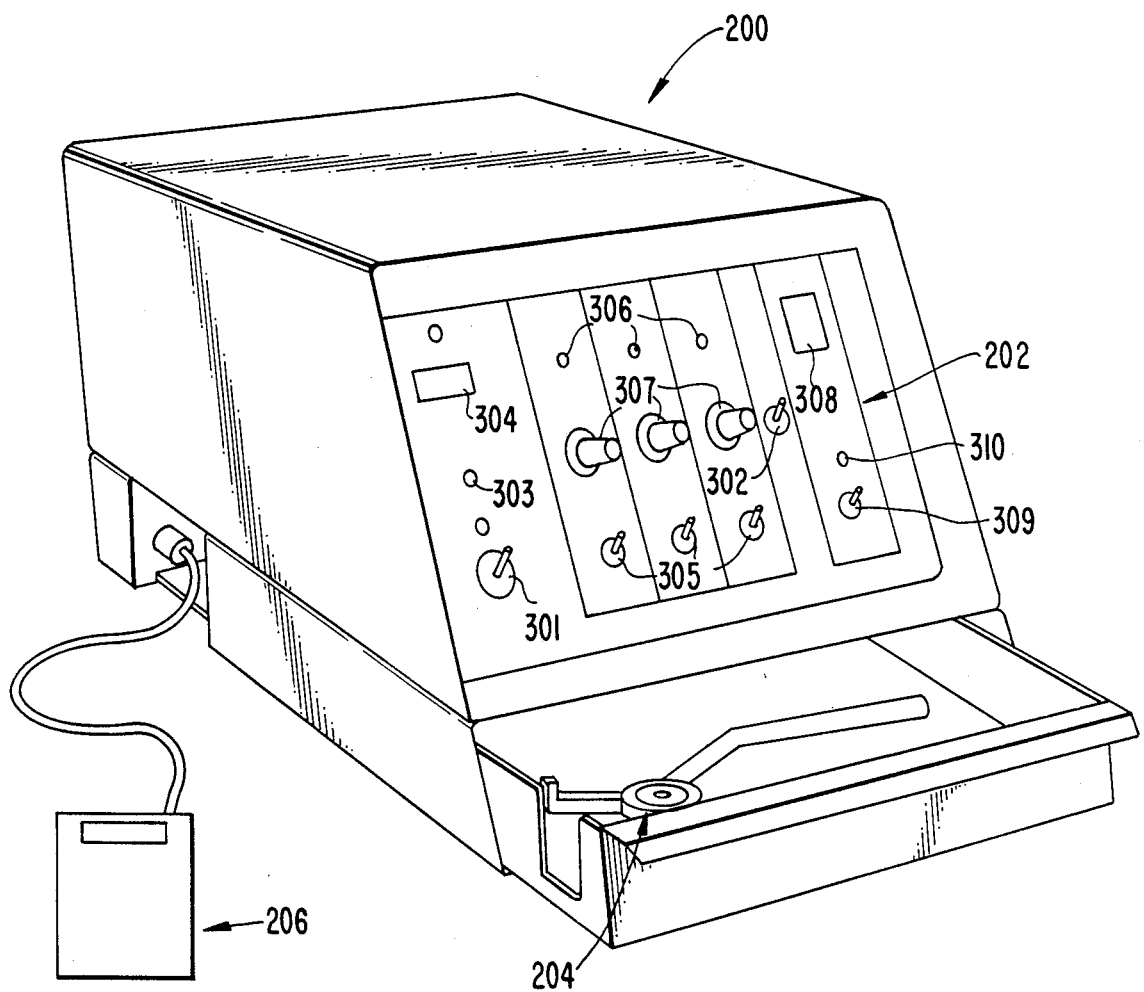
FIGS. 4A and 4B are perspective views of the portable welding machine or system of the present invention.
Figure 4B:
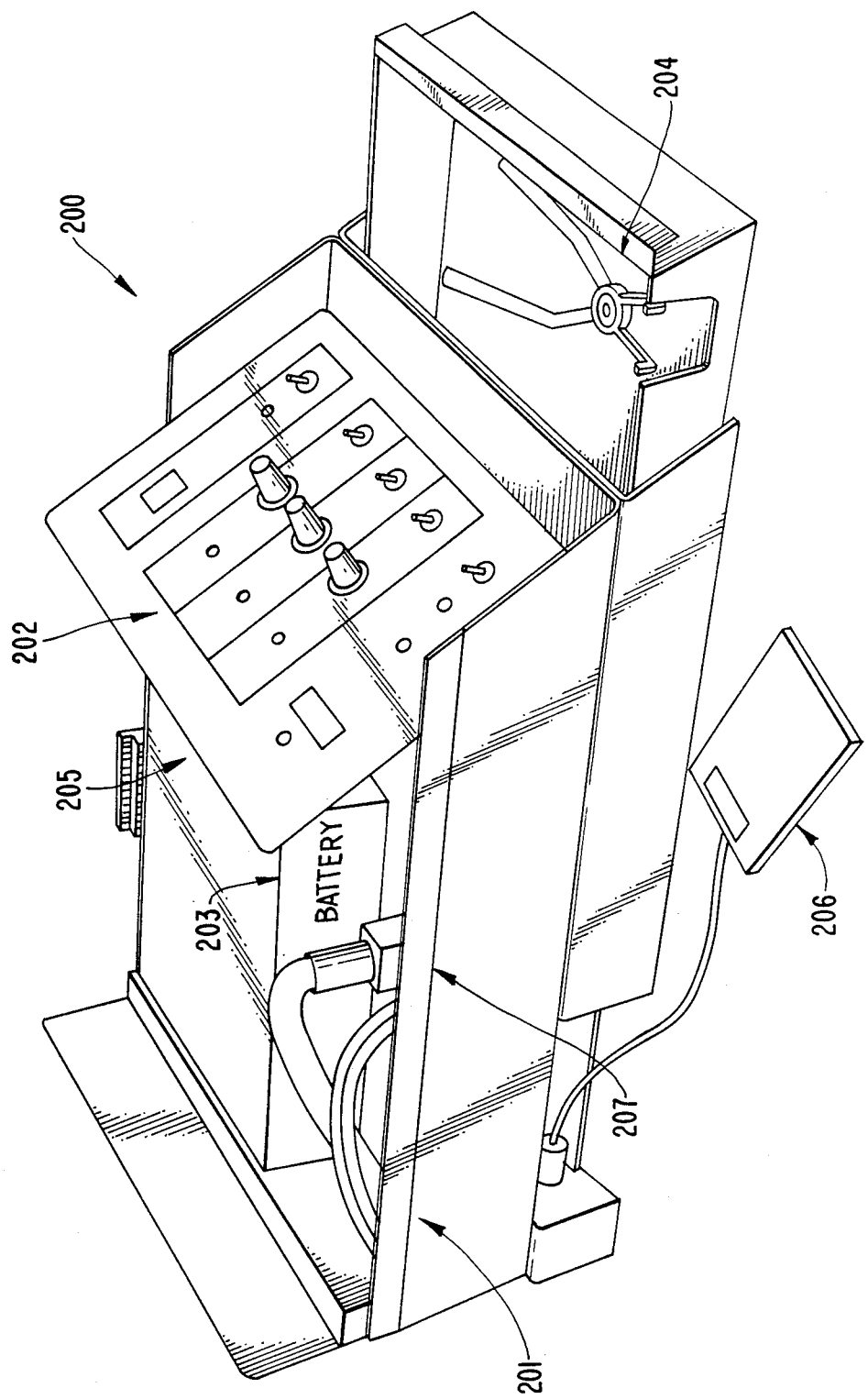

FIGS. 4A and 4B are perspective views of the portable welding machine or system 200 of the present invention. As seen in FIG. 4A, the machine 200 basically comprises a control panel 202, a weld clamping tool or precision welding gun 204, and a foot-operated weld-start control 206. As further seen in FIG. 4B, the machine 200 also includes a battery module 203, control circuitry 205 (in the form of a printed circuit board), and an electronic power switch 207 (implemented by a silicon-controlled rectifier (SCR)).

The machine 200 basically operates to discharge electrical energy stored in suitably large capacitors into elements or workpieces to be welded. Preferably, sequences of discharge pulses of controlled energy are used in order to achieve best results.

Referring to FIGS. 4A and 4B, the control panel 202 contains all controls and indicators needed for mode selection and manual operation of the machine 200. Preferably, the console 202 contains the following controls: an ON switch 301 which is operated to turn on the machine 200, at the same time closing the circuit to the internal battery 203; a mode control switch 302 for selecting manual mode or memory mode; a WELD-ON indicator 303 comprising a light-emitting diode (LED) which turns on during the welding cycle; a battery charge level indicator 304 comprising a small meter which provides an indication of the battery charge status; a plurality of PULSE ON switches 305 (preferably, three pulse switches) by means of which a certain number of weld pulses (preferably, three weld pulses) can be selected by switching on appropriate ones of the pulse switches; pulse light indicators 306 comprising a number of LED's, equal in number to the number of pulse switches, indicating which weld pulse is being carried out; pulse level controls 307, one for each of the pulses, for manually controlling the voltage charge level of the capacitors which store and then discharge electrical energy through the welding tool 204 (preferably, the voltage charge level of any pulse can be controlled between 3 and 15 volts); memory address thumb-wheel selection switches 308 which permit the selection of a particular memory location (from a plurality, preferably 256, memory locations) for reading data from the memory location during the memory mode or writing data to the memory location in the manual mode; a WRITE START push-button 309 used in the manual mode to start the writing cycle, by means of which a three-pulse welding sequence is recorded into a given empty memory location, as selected by the aforementioned memory address selection switch; and a WRITE ON indicator 310 comprising an LED which lights to indicate when the memory writing cycle is operating properly.

With respect to the mode control switch 302, only the manual and memory modes can be selected from the control panel 202 using the mode control switch 302. The third mode, an external control mode, is selected automatically when a proper interface connector is connected to the printed circuit board remote interface connector 218c (FIG. 3) in the control circuitry 205 (as further discussed below).

In the manual mode of operation of the machine 200, up to three pulses of different preselected energy levels can be applied using controls provided on the control panel 202. Up to 256 different three-pulse sequences can be stored permanently in a digital memory unit contained in control circuitry 205 of the machine 200. The words "stored permanently" indicate that, when the equipment is powered down, data is not lost.

In the memory mode of operation of the machine 200, stored sequences of three welding pulses of different energy can be recovered on a selective basis from locations within the internal memory, and the aforementioned memory address thumb-wheel selections switches 308 are utilized to select the particular memory address from which the welding pulse information is to be recovered. The three welding pulses can be repeatedly applied by pressing the foot-operated weld-start control 206.

The external control mode of operation of the machine 200 provides remote control, from an external computer, of capacitor energy level, welding start time after the end of capacitor charging, and the number of applied welding pulses. The provision of an external control mode of operation of the machine 200 enables the machine 200 to be used for more complex welding sequences, as developed and initiated by use of the external computer connected, via an interface connector in the control circuitry 205, to the machine 200.

In the manual mode of operation, the generation of welding sequences is controlled as follows: the mode control switch 302 is set to "manual"; the PULSE ON switches 305 are operated to set the desired number of weld pulses; the pulse level control switches 307 are operated to adjust the levels of the pulses, while the weld-start control switch 206 is foot-operated to test the weld sequences until the best weld results are achieved; and, finally, the tested welding sequences are applied to the elements to be welded.

In the manual mode of operation of the machine, entry of weld sequence data into the memory in control circuitry 205 is achieved in the following manner: PULSE ON switches 305 are set to the "on" position; pulse level control switches 307 are operated to adjust the pulse levels while the footoperated weld-start control switch 206 is used to test the weld sequences for best weld results; the memory address selection switches 308 are set to a memory address not already in use; a status check of the memory location is carried out by turning the mode control switch 302 to "memory" status, using the foot-operated weld-start control switch 206 to attempt to start the welding cycle, and, if the weld cycle commences as indicated by the turning on of the WELD ON indicator 303 followed by rapid turn-off of the indicator 303, the memory location is considered to be empty, that is, usable for storing a new welding sequence; the mode control switch 302 is reset to the "manual" position; the memory storage or "write" cycle is begun by operation of the WRITE START push-button switch 309, as a result of which the weld cycle will commence in the normal manner but the welding cycle will be permanently stored at the memory address selected; the mode control switch 302 is reset to the "memory" status; the foot-operated weld-start control switch 206 is operated to start the weld cycle and the weld cycle is repeated in accordance with the stored sequence; and, finally, the operator records in a welding sequence "log book" the memory address and the characteristics of the stored welding sequence (such as welded parts material, thickness, etc.), thus providing proper information for future use of the welding sequence library.

In the memory mode of operation of the present invention, stored welding pulse sequences can be recovered in the following manner: the PULSE ON switches 305 are set to the "on" position; the mode control switch 302 is set to "memory"; the memory address selection switches 308 are set to a value corresponding to the memory location in which the desired information is stored; as an option, the operator can then check the status of the selected memory location by operation of the foot-operated weld-start control switch 206 to attempt starting of the welding cycle, followed by a check of the WELD ON indicator 303 (if the indicator comes on, indicating the start of the welding cycle, the correct memory location has been selected); and, finally, the stored welding cycle is commenced by operation of the foot-operated weld-start control switch 206 so as to recover and implement the stored weld sequence.

Figure 5:
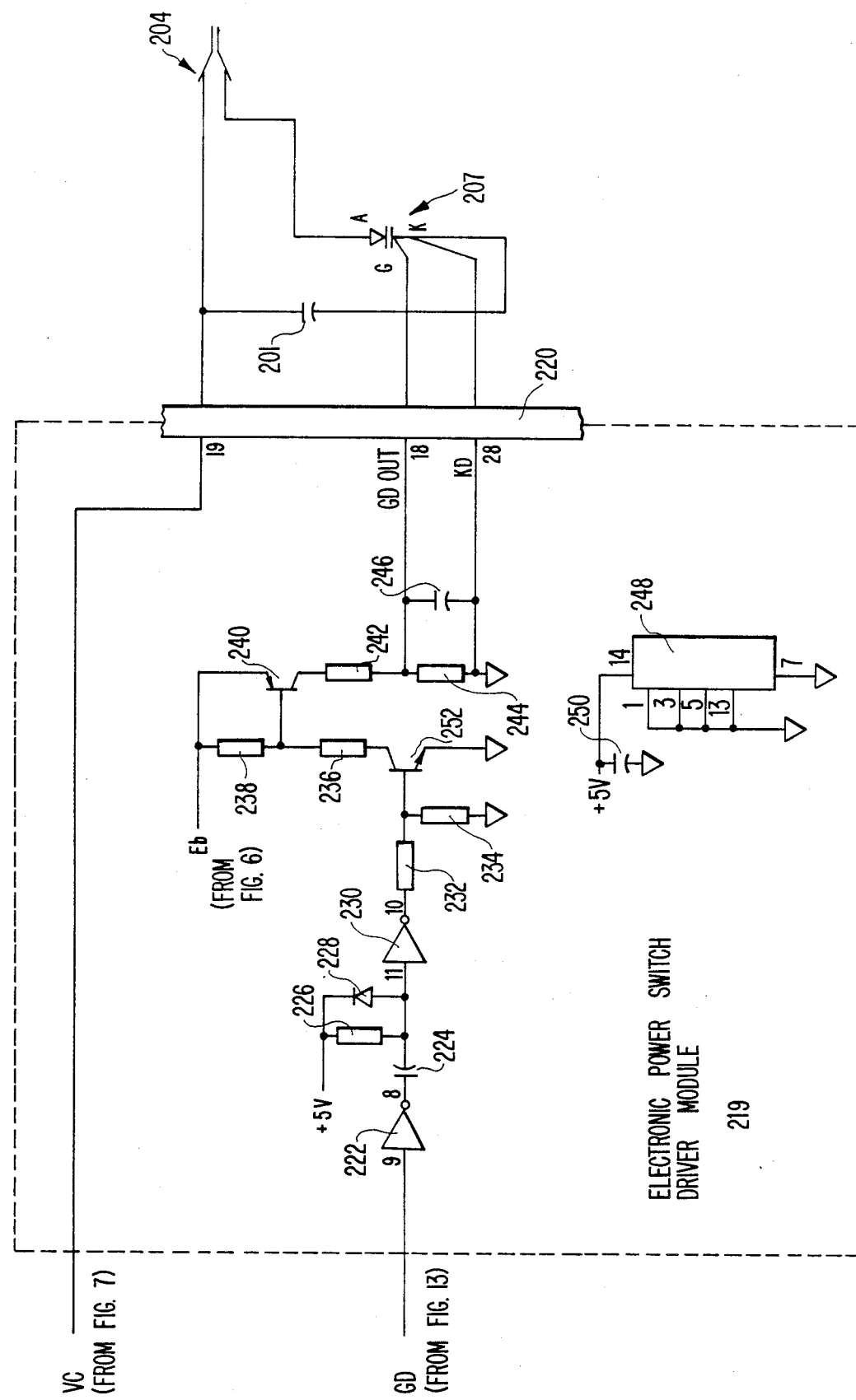
FIG. 5 is a circuit diagram of the high energy capacitor module, welding gun or tool, electronic power switch and a portion (electronic power switch driver module) of the control circuitry of the system of FIG. 3.

FIG. 5 is a circuit diagram of the high energy capacitor module, the welding gun or tool, the electronic power switch, and a portion of the control circuitry of the system of FIGS. 3 and 4B. As seen in FIG. 5, an electronic power switch driver module 219 in the control circuitry 205 of FIGS. 3 and 4B is connected via the electronic power switch 207 to the welding gun 204 via an appropriate connector or interface 200.

The high energy capacitor module 201 comprises low impedance, high energy, liquid-aluminum output capacitors inw hich the electrical energy used in the welding pulses is stored. By means of the module 201, the large values of electrical pulse necessary for proper welding are available and provided to the welding gun 204 during the welding operation.

Returning to FIG. 4B, the battery module 203 contains batteries having a total battery voltage of 18 volts D.C., these batteries permitting operation in full insulation from the main power line, thus providing human safety during operation of the machine 200.

The welding gun or weld clamping tool 204 (FIGS. 4B and 5) is a special tool designed for constant and adjustable pressure on the elements being welded so as to permit repeatable mechanical conditions for best welding results. The design and detailed operation of the welding gun 204 have been discussed above with reference to FIGS. 1 and 2.

Further referring to FIG. 4B, as previously mentioned, the foot-operated weld-start control switch 206 is used in both the manual and memory modes of operation to activate a selected welding sequence. This foot-operated switch 206 is employed in order to free the hands of the operator for operation of the welding gun 204.

The electronic power switch 207 (FIGS. 3, 4B and 5) is a high-power silicon-controlled rectifier (SCR) used to close the circuit between the capacitor module 201 and the welding gun 204, thus providing for the application of the high-energy welding pulses to the gun 204.

The control circuitry 205 of FIGS. 3 and 4B is, as previously explained, implemented by a circuit board. The control circuitry 205 basically comprises the following elements: an auxiliary power supply 211 (FIG. 6), ADC and DAC converter circuitry 215 (FIG. 8), a digital memory unit 216 (FIG. 9), timing and control circuitry 217 (FIG. 10), interface circuitry 218a–218c (FIGS. 11–13), and an electronic power switch driver module 219 (FIG. 5).

Returning to FIG. 5, the electronic power switch driver module 219 contains the driving circuits necessary to activate the electronic power switch 207. As seen in FIG. 5, the module 219 comprises the following elements: inverting amplifiers 222 and 230; capacitors 224, 246 and 250; resistors 226, 232, 234, 236, 238, 242 and 244; NPN transistor 252; PNP transistor 240; and integrated circuit 248 (MC14584 manufactured by Motorola).

Figure 13:
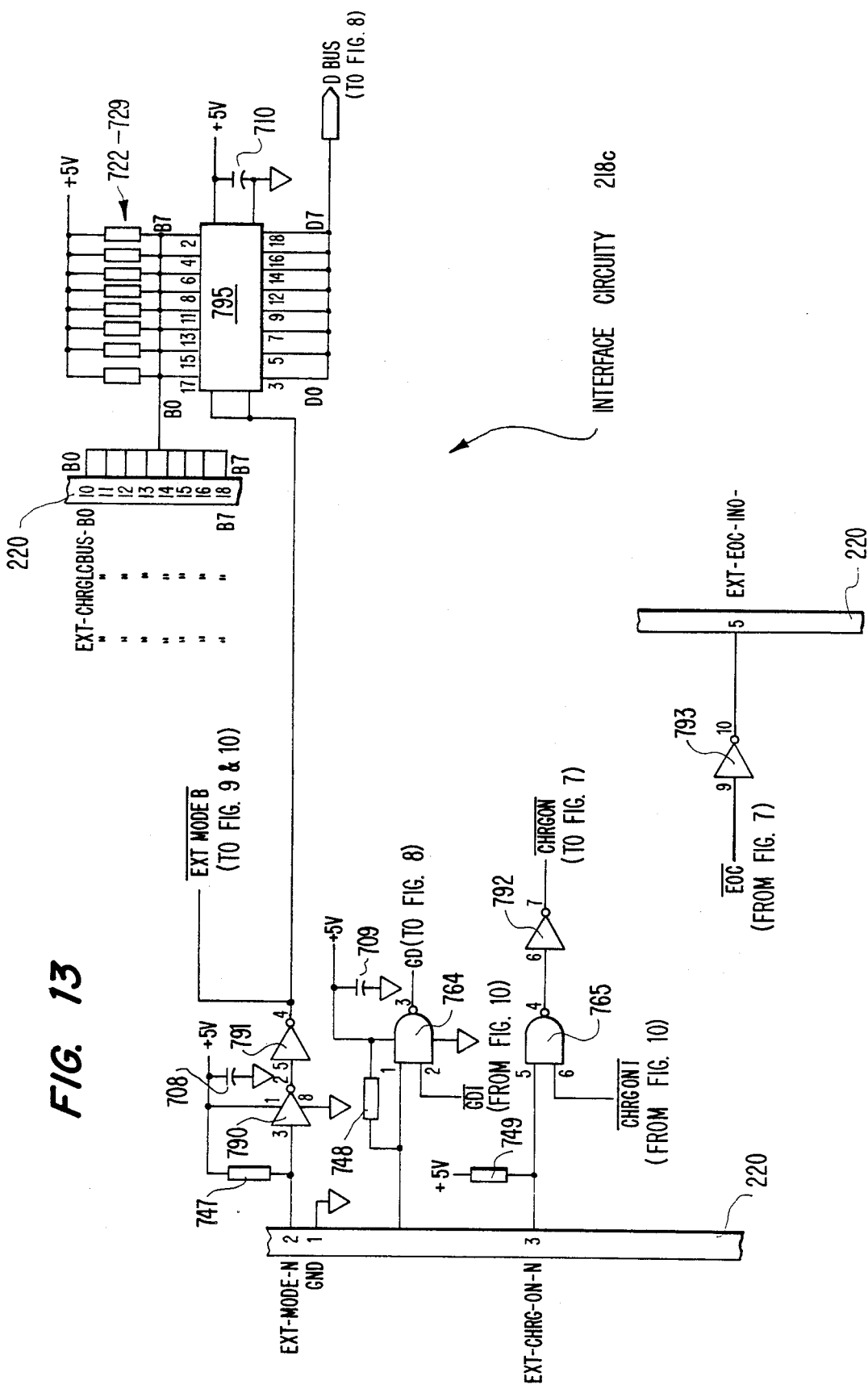
FIG. 13 is a circuit diagram of the external interface circuitry of the system of FIG. 3.

In operation, when the gate drive signal GD from interface circuitry 218c of FIG. 13 changes from low to high, a one-millisecond pulse is formed by inverting amplifiers 222 and 230, capacitor 224 and resistor 226, and this pulse is then amplified by transistors 252 and 240. The output GDOUT is then applied to the gate/cathode circuit of the SCR 207, thus closing the circuit between the capacitor module 201 and the gun 204. It should be noted that a charging voltage VC is provided by capacitor charging module 212 of FIG. 7 via interface 220 to the capacitor 201 and welding gun 204.

Figure 6:
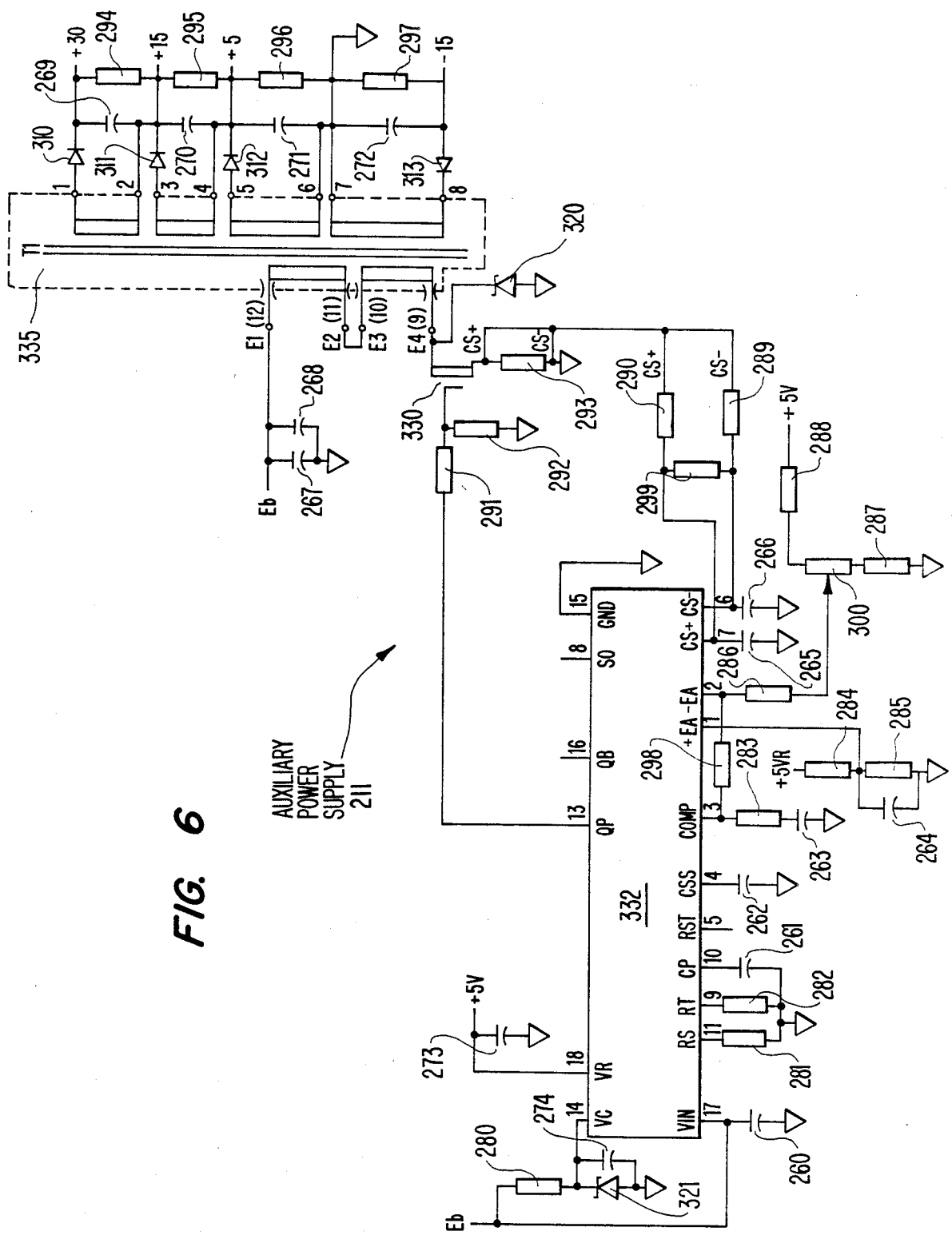
FIG. 6 is a circuit diagram of the auxiliary power supply of the control circuitry of the system of FIG. 3.

FIG. 6 is a circuit diagram of the auxiliary power supply 211 of the control circuitry 205 of the system 200 of FIGS. 3 and 4B. As seen in FIG. 6, the auxiliary power supply 211 comprises capacitors 260–274, resistors 280–300, diodes 310–313, Zener diodes 320–321, field effect transistor 330, integrated circuit 332, and transformer 335. Resistor 300 is, preferably, a 2.2 kilohm/0.2 watt trimmer resistor (M661) manufactured by Siemens. Integrated circuit 332 is UNITRODE UC3526A device which functions as a special controller for switch mode power supply. It is used to control the flyback converter that provides all auxiliary power supplies within the welding machine. Transformer 335 is, preferably, a Cart. S-100 transformer, and delivers as an output of the power supply 211 the following voltages: +5.0 VDC/0.5 amp; +15.0 VDC/0.1 amp; −15.0 VDC/0.1 amp; and +30.0 VDC/0.1 amp. The operating frequency of the configuration of FIG. 6, which operates as a flyback converter for DC-to-DC voltage conversion, is 100 kHz.

Figure 7:
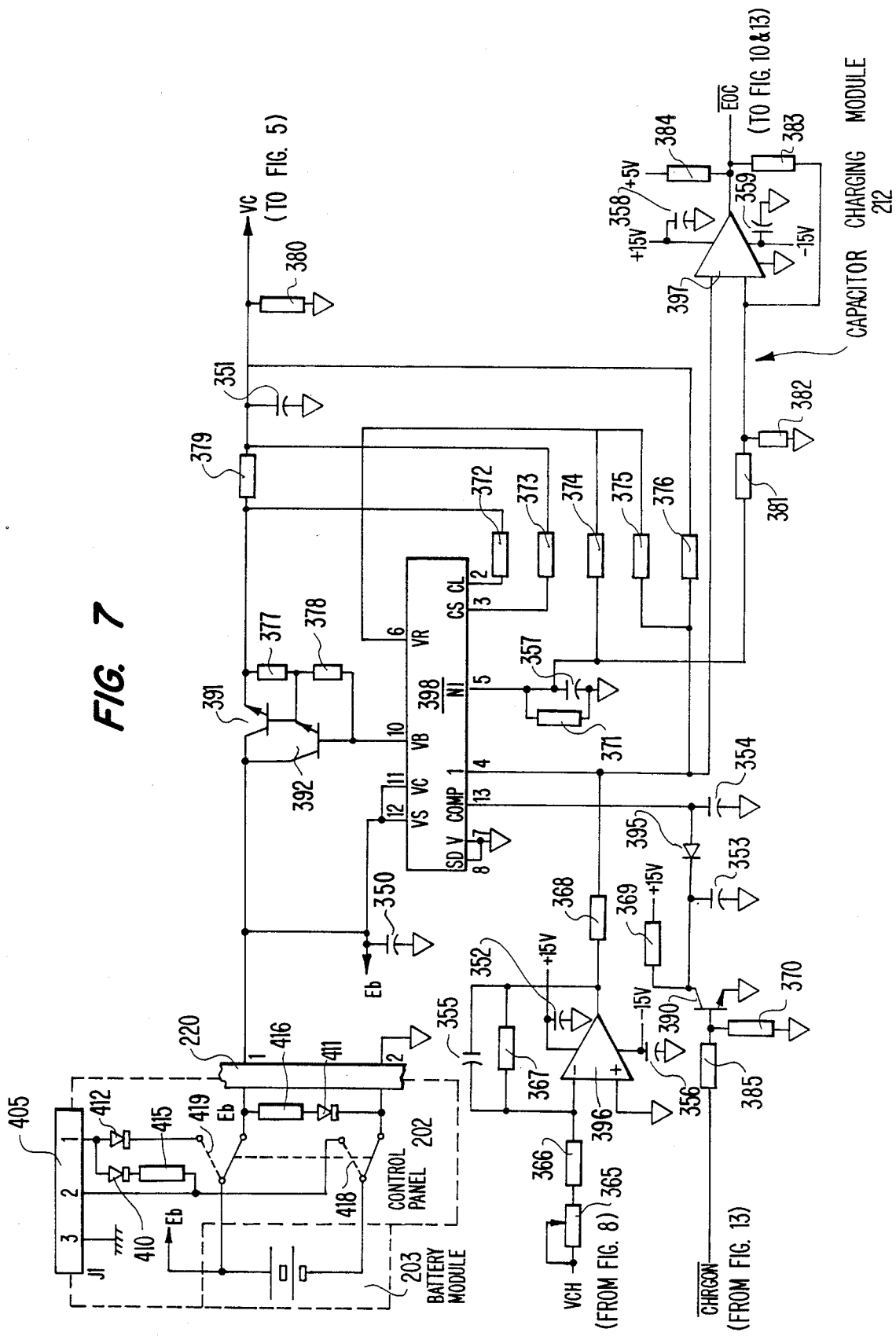
FIG. 7 is a circuit diagram of the capacitor charging control and battery module of the system of FIG. 3.

FIG. 7 is a circuit diagram of the capacitor charging module 212 of FIG. 3. Also shown in FIG. 7 are a portion of control panel 202 and battery module 203, the capacitor charging module 212 being connected to the control panel 202 via interface 220.

As seen in FIG. 7, the capacitor charging module 212 comprises capacitors 350–359, resistors 365–385, NPN transistors 390–392, diode 395, amplifiers 396–397 and integrated circuit 398. Resistor 365 is, preferably, a 10 kilohm/0.2 watt trimmer resistor (M661) manufactured by Siemens. Amplifier 396 is, preferably, a differential amplifier (uA741Z) manufactured by Fairchild, while amplifier 397 is, preferably, a differential amplifier (LM111Z) manufactured by National Semiconductor. Integrated circuit 398 is, preferably, a voltage regulating integrated circuit (SG3532) manufactured by Silicon-General.

The portion of control panel 202 appearing in FIG. 7 is seen to comprise LED's 410–412, resistors 415–416, and switches 418–419.

The capacitor charging module 212 provides for controlled charging of the high energy capacitor module 201 of FIGS. 4B and 5. This function is accomplished by the serial regulator formed by integrated circuit 398 and interconnected transistors 391 and 392 (as well as some passive devices indicated in FIG. 7). The high energy capacitor module 201 (FIGS. 4B and 5) is charged to a voltage level controlled by signal VCH, an input signal provided to capacitor charging module 212 by the converter circuitry 215 of FIG. 8. The input VCH is applied, through offset/gain amplifier 396, to the integrated circuit device 398. As soon as the output capacitors charging voltage reaches a preset value, the voltage comparator 397 is activated, changing the level of the signal EOC (inverted) to a low level. The capacitor charge current is limited to four amperes, thus avoiding damage to power transistors 391 and 392. The capacitor charging module 212 is switched on and off by a control signal CHRGON (inverted) provided by interface circuitry 218c of FIG. 13, a low level of this signal input activating the module 212.

Figure 8:
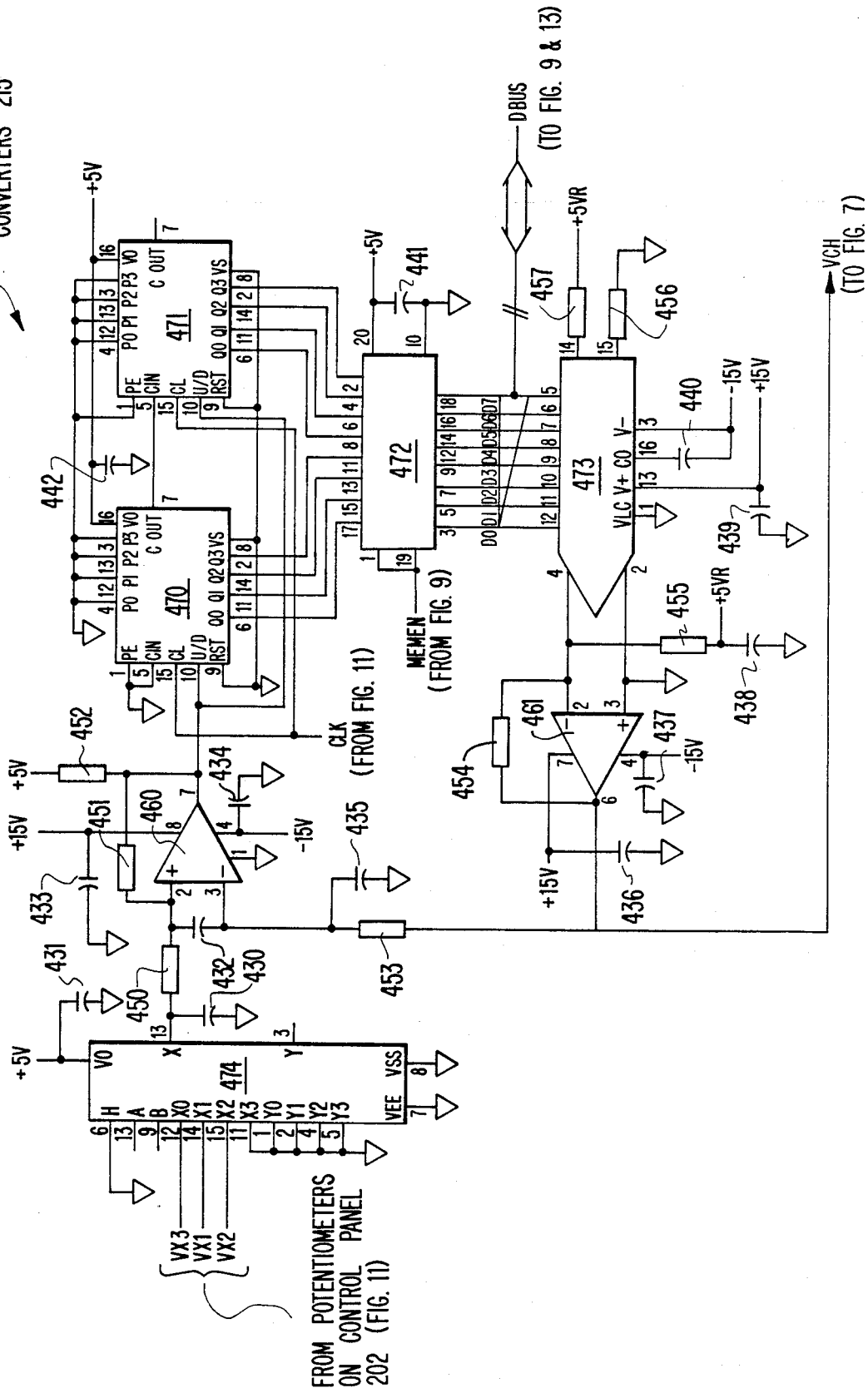
FIG. 8 is a circuit diagram of the analog-to-digital converter (ADC) and digital-to-analog converter (DAC) circuitry of the system of FIG. 3.

FIG. 8 is a circuit diagram of the ADC and DAC circuitry 215 of the control circuitry 205 of FIGS. 3 and 4B. As seen in FIG. 8, the circuitry 215 comprises capacitors 430–442, resistors 450–457, amplifiers 460–461 and integrated circuits 470–474. More specifically, integrated circuits 470 and 471 comprises C-MOS elements (MC14516) manufactured by Motorola; element 472 comprises an integrated circuit (74LS244); element 473 comprises an integrated circuit (DAC08); amplifier 460 comprises an integrated circuit (LM111Z) manufactured by National Semiconductor; amplifier 461 comprises an integrated circuit (uA741Z) manufactured by Fairchild; and integrated circuit 474 comprises a C-MOS device (MC14052) manufactured by Motorola.

Figure 9:
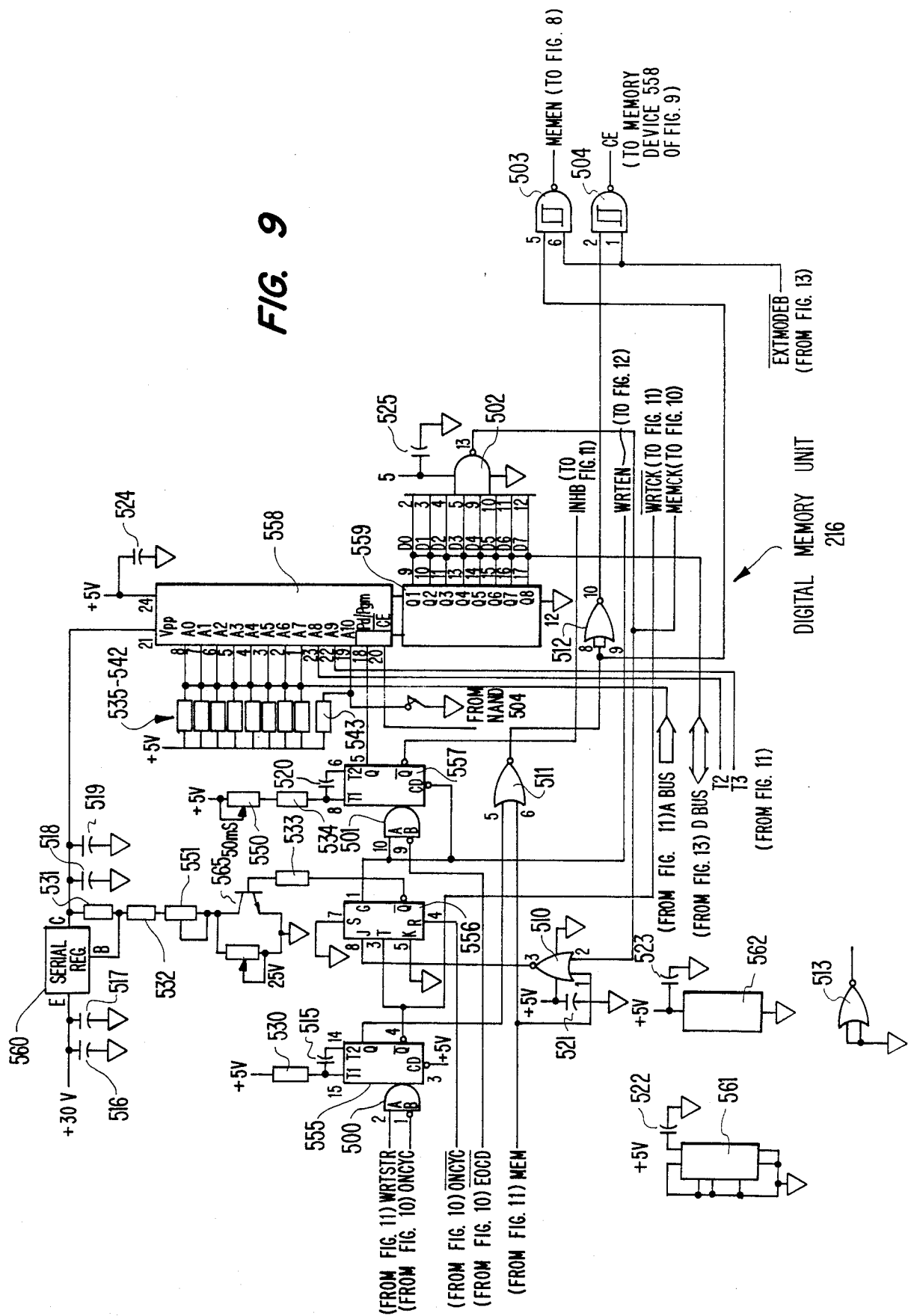
FIG. 9 is a circuit diagram of the digital memory unit of the system of FIG. 3.

The circuitry 215 of FIG. 8 operates in two different modes according to the logic level of the control signal MEMEN received from the digital memory unit 216 of FIG. 9. When MEMEN is low level, a manual mode of operation is carried out; conversely, when MEMEN is high level, the memory mode or remote mode of operation is carried out.

In the former case, the manual mode, circuitry 215 operates to convert an analog signal input to digital form. Specifically, an analog signal input is provided at inputs VX1, VX2 or VX3 of the C-MOS device 474 which functions as an analog switch to select the given analog signal based on the identity of control signals T2 and T3, also provided to device 474. Specifically, T2=0, T3=0 selects VX1; T2=1, T3=0 selects VX2; and T2=0, T3=1 selects VX3. T1 equals 0 in each case. The analog output X of switch 474 is then converted to an eight-bit parallel data digital signal by a conversion circuit comprising voltage comparator 460, two four-bit up/down counters 470 and 471, and an 8-stage 3-state buffer 472. The resultant digital signal is provided to the system bus DBUS.

Correspondingly, 8-bit digital data D0–D7 provided to or received over the bus DBUS are converted to analog form in DAC device 473 and analog buffer amplifier 461, the resultant analog signal being provided as output VCH to the capacitor charging module 212 of FIG. 7.

Thus, in the manual mode of operation of the present invention, control signal MEMEN from digital memory unit 216 of FIG. 9 is in the low state, and as a result the two four-bit up/down counters 470 and 471 are connectd to the DAC element 473 via the buffer 472. When the operator adjusts one of the potentiometers on control panel 202, analog switch 474 selects one of the potentiometer inputs VX1–VX3 and provides the selected potentiometer signal on output X via comparator 460 tot he counters 470 and 471. Counters 470 and 471 convert the analog signal to digital form, and provide the 8-bit digital signal via buffer 472 to the DAC 473, wherein it is converted to analog form and provided via amplifier 461 as output VCH to the capacitor charging module 212.

In the memory or remote mode of operation of the present invention, the control signal MEMEN is in the high state, and the counters 470 and 471 are not connected to the DAC 473. Rather, the digital data bus DBUS receives digital data either from digital memory unit 216 of FIG. 9 (in the case of memory mode of operation) or from the interface circuitry 218c of FIG. 13 (in the case of remote mode of operation). The digital data received over bus DBUS is converted to analog form in DAC 473, and the resultant analog signal is provided via amplifier 461 as output VCH to the capacitor charging module 212 of FIG. 7.

FIG. 9 is a schematic diagram of the digital memory unit 216 of the control circuitry 205 of FIGS. 3 and 4B. As seen in FIG. 9, digital memory unit 216 comprises: C-MOS monostable devices 500, 555 and 501, 557; memory device 558, 559, 502; NAND gates 503 and 504; NOR gates 510–513; capacitors 515–525; resistors 530–543; trimmer resistors 550–552; and transistor 565.

Trimmer resistors 550–552 are, preferably, trimmer resistors (M701) manufactured by Siemens, and having values of 22 kilohm, 1 kilohm and 22 kilohm, respectively, with power ratings of 1/4 watt each. Transistor 565 is a standard NPN transistor. Elements 500, 555 and 501, 557 are C-MOS monostable devices (74C221) manufactured by Motorola. Elements 556 and 561 are C-MOS devices (MC14027) manufactured by Motorola. Element 558, 559, 502 is a 16 kilobit erasable, programmable read-only memory (EPROM) device (TMS2516-35JL) manufactured by Texas Instruments. NOR gates 510–513 are parts of a C-MOS device (MC14001UB) manufactured by Motorola. Finally, integrated circuit element 560 is preferably a positive serial regulator device (SG337T) manufactured by Silicon General, and is used to supply memory device 558 with two different voltage levels: $-V_{pp}=5$ volts D.C. for normal operation and $-V_{pp}=22$ volts D.C. for memory writing.

In operation, the digital memory unit 216 provides all memory-related functions, that is, testing, writing and reading. Tests are performed to validate the selected memory locations in conjunction with both memory writing (in the manual mode of operation) and memory reading (in the memory mode of operation) operations. Preferably, a memory location is considered to be vacant if all data bits are at a high logical area. Accordingly, in writing operations, a single test is performed at the beginning of the writing cycle to determine whether or not the selected address points to an empty memory location, while in reading operations a test is made for any of the selected welding pulses to preclude dangerous levels of energy from being applied to elements being welded.

Preferably, the digital memory unit 216 employs an ultra-violet erasable, programmable read-only memory (EPROM) as memory device 558, 559, 502 for permanent continuous storage of welding sequences. A 256×3×8 bit array is used for a storing operation, and a second set of 256 locations can be accessed by merely closing an internal contact available on the printed circuit board embodying the control circuitry 205 of FIGS. 3 and 4B. As is well-known in the art, the latter type of EPROM can be completely erased using ultra-violet light exposure according to manufacturer specifications.

Figure 11:
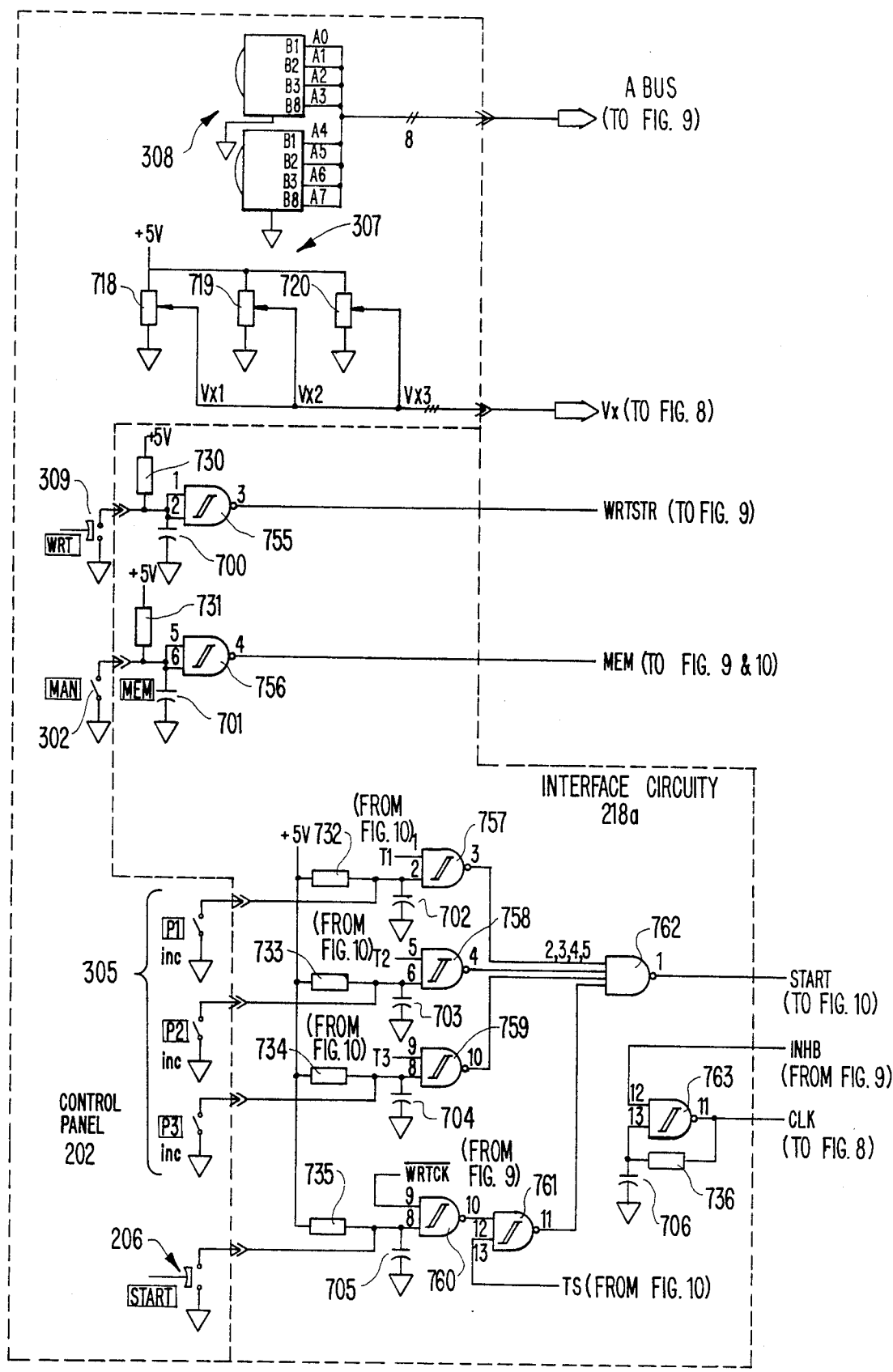
FIGS. 11 and 12 are circuit diagrams of the control panel and console interface circuitry of the system of FIG. 3.

Many input/output control signals are involved in the operation of the digital memory unit 216. In the manual or remote modes of operaiton, the input signal MEM from interface circuitry 218a of FIG. 11 is low level. In addition, since the WRTSTR input from FIG. 11 is constantly low level in this mode, the output of AND gate 500 is low, and the Q output of element 555 is high. Accordingly, the output of NOR gate 511 is low, the output of inverting NOR gate 512 is high and, since EXTMODEB (inverted) is high, the output of CE of NAND gate 504 is low. The latter low-level CE signal is inverted to high and applied to the "chip enable" port of memory device 558 so that the memory device 558 is not active for reading data, and no significant controls are performed by the digital memory unit 216 under these operating conditions.

The J input of flip-flop 556 (which acts as a memory write enable flip-flop) is low level. In addition, the T input of flip-flop 556 is constantly high. As a result, flip-flop 556 is not pre-loaded and, as a consequence, no programming pulse is formed by flip-flop 557 since AND gate 501 associated with flip-flop 557 maintains flip-flop 557 in a non-active state.

Finally, it should be noted that the controlled serial regulator 560 is not switched to 24 volts D.C., the memory programming voltage level. More specifically, the regulator 560 is controlled by variation or modification of the feedback ratio of the voltage dividers formed by resistors 531, 532, 551 and 552 used to close the voltage feedback from the output of regulator 560. Since flip-flop 556 is not "on" (writing to memory is disabled), transistor 565 is "on" as enabled by the inverted Q output of flip-flop 556, and regulator 560 does not deliver the 24 volts D.C. required for a "memory write" operation.

When, in the manual mode of operation, a memory writing operation is to be carried out, th operator activates the WRITE START push-button 309 on the console 202 of FIGS. 4A and 11, and the WRITE START output of interface circuitry 218a (FIG. 11) goes high. Since ONCYC is low, the transition of WRTSTR from low to high triggers the monostable device 555 (FIG. 9), so that the device 555 forms a 100-millisecond pulse on its Q output. The output of NOR gate 511 goes low, so as to force the CE (inverted) port of the memory device 558 to a low level, thus selecting it for reading. If the selected memory location is empty, a low level is achieved at the output of NAND gate 502 (the memory check signal MEMCK), and thus the NOR gate 510 provides a high-level signal at the J input of the flip-flop 556 (since the MEM input to NOR gate 510 is low in the manual mode). When the pulse output of monostable device 555 reverts to a low level, the flip-flop 556 is pre-loaded to a high level, thus enabling the writing cycle (that is, WRTEN, the Q output of flip-flop 556, goes high).

At this juncture, transistor 565 is switched to an off or open condition by the Q (inverted) output of flip-flop 556 provided via resistor 533. This increases the ratio of voltage divider 531, 532, 551 and 552, causing the $V_{pp}$ voltage applied to the memory device 558 to be 24 volts D.C. so as to permit a "memory write" operation to be carried out.

Figure 10:
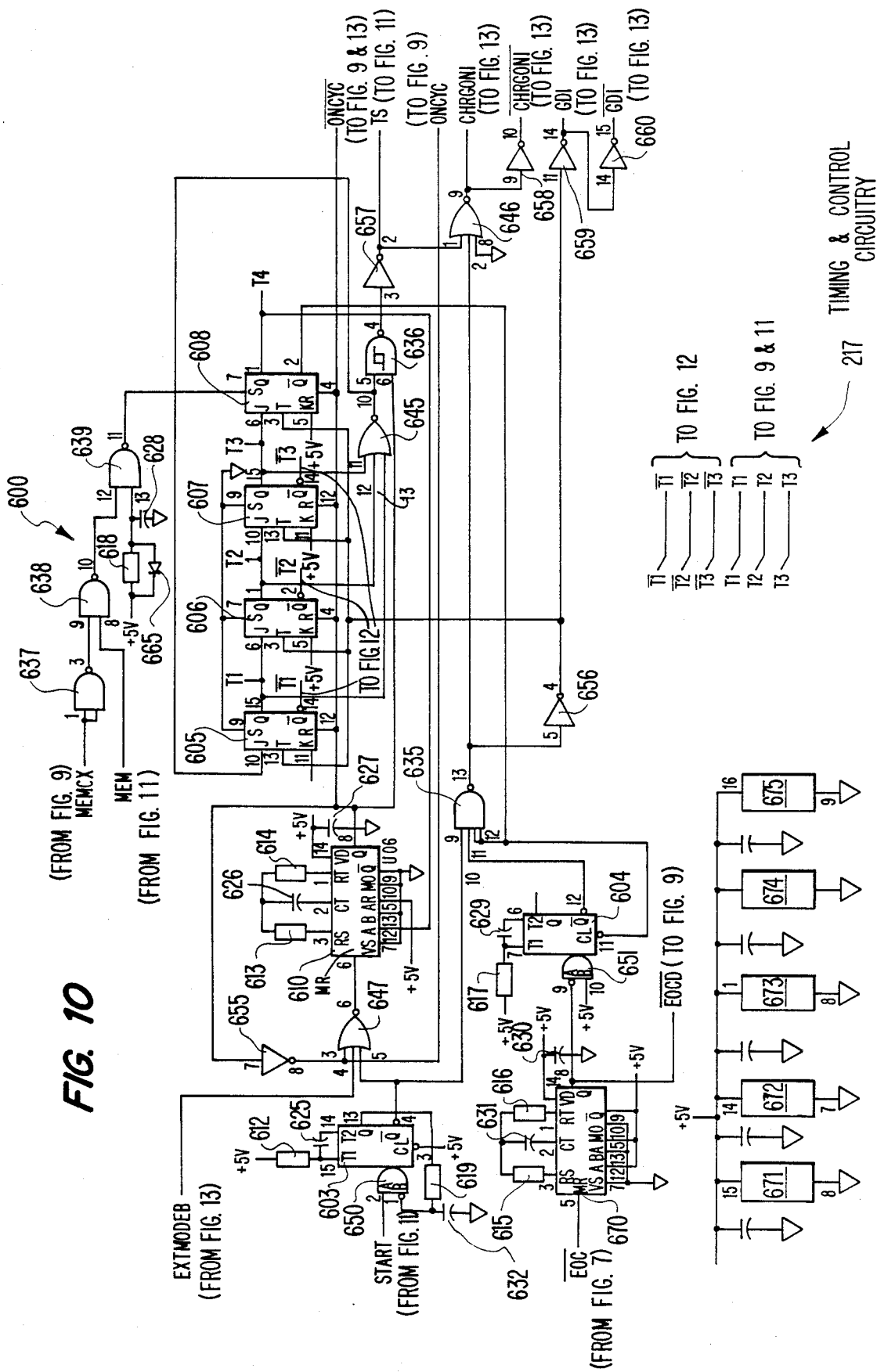
FIG. 10 is a circuit diagram of the timing and control circuitry of the system of FIG. 3.

Monostable 557 is now enabled because input port A of AND gate 501 is high. At the same time, the output capacitor 201 (FIG. 8) is charging. As soon as it reaches the end of its charging cycle, EOC (inverted) goes low and, after a short delay, the inverted end-of-charge delayed signal EOCD (inverted) changes to a low condition, thus activating the monostable 501,557 (based on a time constant of 200 milliseconds) to generate a high Q output for 50 milliseconds, thus enabling the programming port of the memory device 558 to the "internal store" mode and writing electrical welding information thereto. It should be noted that, when the memory location is not empty, MEMCK is high so that NOR gate 510 does not change status, and flip-flop 556 is low. Flip-flop 556 is not activated to high status when monostable 555 reverts to its "rest" state. During the period of activation of the writing pulse, an inhibit signal INHB is generated via the Q (inverted) output of flip-flop 557. Moreover, timing signals T2 and T3 from FIG. 10 are provided to the memory device 558 and are used to select different memory locations for each of the welding pulses (T2=0, T3=0 selects VX1; T2=1, T3=0 selects VX2; and T2=0, T3=1 selects VX3).

During the memory mode of operation of the present invention, the MEM signal from FIG. 11 is high. As soon as the welding cycle starts, the signal ONCYC (inverted) from FIG. 10 changes to a low condition, and the following control process takes place. Since the WRTSTR signal is low, the input port of monostable 555 is disabled, and monostable 555 does not fire. As a result, no action takes place with respect to the flip-flop 556, since its T input is constantly high. In addition, monostable 557 is not activated since its A input port is low.

Since the MEM input is high, the output of NOR gate 511 is low, resulting in a high MEMEN output of NOR gate 512. So long as EXTMODEB (inverted) is high (i.e., no external controller is connected), NAND gate 504 enables the memory device 558 for reading data. Conversely, for non-local operation (i.e., an external controller is connected), EXTMODEB (inverted) is low, thus precluding enablement of memory device 558 by NAND gate 504.

For any of the selected welding pulses, the signal MEMCK is high only when the employed memory location is written to (i.e., at least one of the data bits is low-level). If any attempt is made to employ an empty memory location, MEMCK goes low, and a low input is applied to the input port of memory device 558.

FIG. 10 is a circuit diagram of the timing and control circuitry 217 contained in the control circuitry 205 of the system 200 of FIGS. 3 and 4B. As seen in FIG. 10, timing and control circuitry 217 comprises: monostable devices 603, 650 and 604, 651; flip-flops 605-608; timer circuit 610; resistors 612-619; capacitors 625-632; NAND gates 635-639; NOR gates 645-647; inverters 655-660; diode 665; and integrated circuit elements 670-675.

Timing and control circuitry 217 of FIG. 10 performs the central control and timing functions of the welding machine of the present invention. Accordingly, the operation of the timing and control circuitry 217 is critical to the operation of the other portions of the control circuitry 205 of FIGS. 3 and 4B.

In general, the welding cycle commences when the timer circuit 610 is activated by a momentary reset signal provided by the NOR gate 647. Details relative to the origin of such a reset signal will be discussed in more detail below in conjunction with a further discussion of the operation of the present invention.

Further referring to FIG. 10, each of the flip-flops 605-608 is related to a particular stage of the welding cycle. Flip-flop 605 is in the on or high state during the first welding pulse, flip-flop 606 is in the on or high state during the second welding pulse, flip-flop 607 is in the on or high state during the third welding pulse, and flip-flop 608 goes on or high at the end of the welding cycle in order to reset the welding machine to its "rest" status. As seen in FIG. 10, flip-flops 605-608 are cascaded together and, when their toggle (T) ports are commonly activated, a flip-flop in the high state will revert to low while the flip-flop following in the cascade arrangement will change to high. Further details relative to the operation of the arrangement of FIG. 10 will be provided subsequent to a discussion of the arrangements shown in the other figures.

Figure 12:
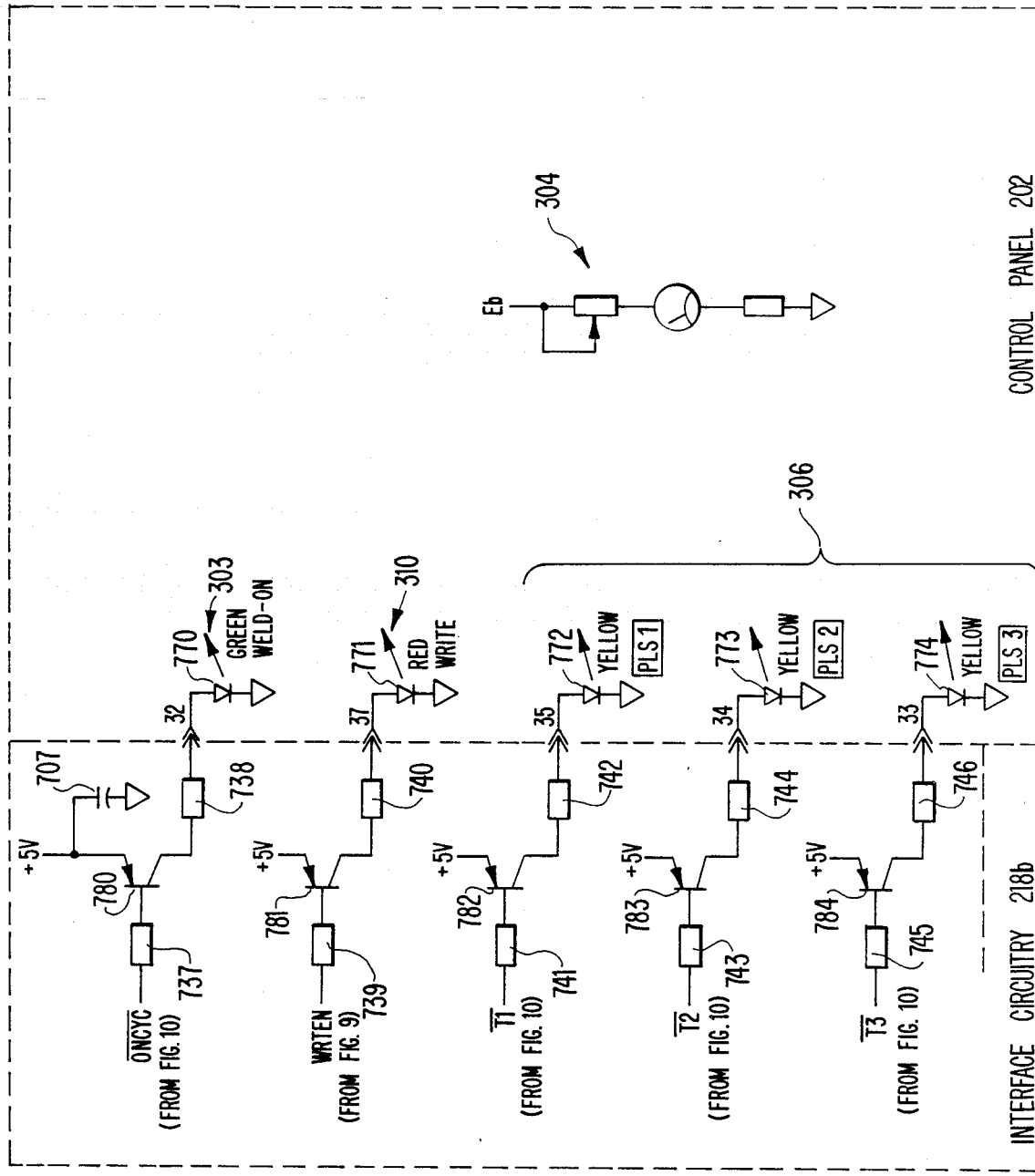

FIGS. 11, 12 and 13 are circuit diagrams of the interface circuitry 218a, 218b and 218c, respectively, of the interface circuitry 205 of FIGS. 3 and 4B. Portions of the control panel 202 of FIGS. 4A and 4B are also shown in FIGS. 11 and 12. Accordingly, FIGS. 11 and 12 depict the circuitry necessary for interfacing with the control panel or console 202 of FIGS. 4A and 4B, while FIG. 13 show the circuitry necessary for interfacing with an external controller via an interface connector 220.

As seen in FIGS. 11, 12 and 13, the interface circuitry 218a, 218b and 218c basically comprises capacitors 700-710, potentiometers 718-720, resistors 722-749, NAND gates 755-765, LED's 770-774, transistors 780-784, inverters 790-793, and integrated circuit element 795.

Referring to FIG. 11, it will be seen that Smith trigger gates in the form of NAND gates 755-760 and 763 are used for anti-bouncing of control signals coming from the electro-mechanical switches (weld-start switch 206, mode control switch 302, PULSE ON switches 305 and WRITE START push-button switch 309) on the control panel 202 of FIG. 4A, as well as the INHB signal from digital memory unit 216 of FIG. 9. In addition, gate 263—implemented by a portion of an integrated circuit (MC14093) device —is employed for the creation of a clock signal CLK provided to converter circuitry 215 of FIG. 8 and used for analog-to-digital conversion.

Further referring to FIG. 11, the memory address selection switches 308 are shown as two thumb wheel switches TSW01 and TSW02 used to select a memory address which is provided to digital memory unit 216 via ABUS. Pulse level control switches 307 are implemented by potentiometers 718-720 which generate analog voltages VX1-VX3 corresponding to the respective pulse levels, and these are provided via output VX to the converter circuitry 215 of FIG. 8 for digital conversion.

Operation of mode control switch 302 between the manual and memory positions results in the generation of mode control signal MEM by NAND gate 756, and this signal is provided to digital memory unit 216 of FIG. 9 and timing and control circuitry 217 of FIG. 10. Operation of the WRITE START push-button switch 309 results in the provision by NAND gate 755 of control signal WRTSTR to digital memory unit 216 of FIG. 9. Operation of PULSE ON switches 305 results in the generation by NAND gates 757-759, as enabled by the control signals T1-T3 from FIG. 10, of respective PULSE ON control inputs to NAND gate 762, the latter acting as an OR gate to generate a START output, the latter being provided to timing and control circuitry FIG. 10. The START output of NAND gate 762 is provided also as a result of actuation of the foot-operated weld-start switch 301 in accordance with the control signals WRTCK (inverted) from FIG. 9 and TS from FIG. 10.

Referring to FIG. 12, transistors 780-784 are provided to inerface internal C-MOS signals ONCYC (inverted), WRTEN, T1 (inverted), T2 (inverted) and T3 (inverted) to the LED indicators 303, 310 and 306, respectively. In addition, battery charge level indicator 304 in the control panel 202 of FIG. 12 provides an indication of battery charge level.

Referring to FIG. 13, when an external interface connector is mated with the connector 220, the EXT-MODE-N terminal is grounded and the EXTMODEB (inverted) output of inverter 791 goes low. In this manner, control of the welding machine 200 is passed to an external controller (not shown) connected to the interface 220. The characteristics of the external control signals are further discussed below in connection with a discussion of the remote mode of operation of the present invention. It is sufficient to state, at this point, that the external signals received via connector 220 are controlled by logic elements 764, 765 and 792 (which are implemented by an MC14093 integrated circuit), by inverters 790-793 (implemented as part of an MC14049 integrated circuit), and by integrated circuit element 795 (implemented by a 74LS244 device). The latter element 795 handles data signals B0-B7 received from the external controller via connector 220, the device 795 providing these data signals as data D0-D7 over the DBUS output to converter circuitry 215 of FIG. 8 which converts the digital data to analog form.

The manual mode of operation of the present invention will now be explained in more detail with reference to various figures of the drawings. As described above, the manual mode of operation is selected by setting of the mode control switch 302 of FIG. 4A to the "manual" position, and the welding sequence is activated using the foot-controlled switch 206. With reference to FIG. 11, the status of mode control switch 302 is detected by gate 756 which, when the manual mode is selected, changes the MEM output signal to low level, indicating non-memory operation.

When the welding machine 200 of FIG. 4A is in its "rest" status, signals WRTCK (inverted) and TS of FIG. 11 and T1-T3 of FIG. 10 are in a high state. When the switch 206 (FIGS. 4A and 11) is operated to the closed position, the input of NAND gate 760 (to which switch 206 is connected) goes low, the output of NAND gate 760 goes high, the output of NAND gate 761 goes low, and the output START of NAND gate 762 goes high. Referring to FIG. 10, the leading edge of the START signal acts on monostable device 603, the output pulse of which resets the count state of timer 610. The output signal Q of timer 610, as inverted by inverter 655, forms the output signal ONCYC, which turns on or goes to the high state during the welding cycle. As lons as the timer 610 is running, no "start" action can affect its "reset" port, and moreover no "start" action can reach the timer 610 so long as the welding machine is in the remote mode of operation (EXTMODEB, provided by FIG. 13 to NOR gate 647, is in the high state). The only way in which the timing duration of timer 610 can be reduced is by the presence of a high condition at the set port S of flip-flop 608. Such a high condition will force a high condition to exist at the A port of timer 610 (since the A port of timer 610 is connected to the Q output of flip-flop 608), thus reducing the welding sequence to a very short time length. Such an action takes place for two reasons: (1) during "turn on" of the equipment, so as to avoid an unwanted initial welding cycle (a voltage of +5 volts is applied to resistor 618 so that a low input is applied to NAND gate 639, resulting in a high input to the S port of flip-flop 608); and (2) when, in the memory mode of operation, a blank memory location is selected by means of the memory address selection switch 308 of FIG. 4A, forcing MEMCK to a low level (referring to FIG. 10, a low MEMCK causes a high input to NAND gate 638, causing a low input to NAND gate 639 and a resulting high input to the S port of flip-flop 608).

The reset ports of flip-flops 605–608 are inactive at this point in the procedure, outputs T1–T4 are low level, and the input to the J port of flip-flop 605 is high. As soon as monostable device 603 reverts to the "rest" status, a pre-load action takes place on flip-flop 605, changing output T1 to high level, and starting the first of the three welding pulses in a sequence.

Referring to FIGS. 4A and 11, if the first pulse is selected by operation of the first one of switches 305 to the closed position, the first single-pulse welding sequence, as controlled by output T1 of fli-flop 605 (FIG. 10), will start and will follow the normal control process. If the first process is deselected (the first one of switches 305 is opened), a leading edge of the START pulse will be formed at the output of NAND gate 762 (FIG. 11), thus creating a further toggle pulse via monostable device 603, NAND gate 635, OR gate 646 and inverter 658, and this will turn off output T1 of flip-flop 605 and turn on output T2 of flip-flop 606.

It should be noted that, in the case where the first pulse is selected, output T1 acts on output CHRGONI through NOR gate 645, NAND gate 636, inverter 657 and NOR gate 646, the output CHRGONI becoming high, with the results that the output CHRGON (inverted) of inverter 792 of FIG. 13 goes low, and the capacitor charging module 212 of FIG. 7 is turned on so as to provide charge to the high-energy capacitor module 201 of FIG. 5 via the output VC of capacitor charging module 212 of FIG. 7. Referring to FIG. 7, the charging voltage level VCH provided by converter circuitry 215 of FIG. 8 to the capacitor charging module 212 of FIG. 7 is controlled, in the case of the first pulse, by potentiometer 718 of FIG. 11 associated with the first one of the pulse level control switches 307 of FIG. 4A. Specifically, as a result of the selection of the first pulse by output T1 in FIG. 10, the analog switch 474 in FIG. 8 directs the voltage VX1 from potentiometer 718 in FIG. 11 to the ADC elements 470–472 of the converter circuitry 215 of FIG. 8. Conversion of analog signals to digital and digital signals to analog in the converter circuitry 215 of FIG. 8 has been described above. It is sufficient to state that, when the MEMEN signal from FIG. 9 is in the low condition, coutners 470 and 471 are connected to DAC element 473 via element 472, and conversion to analog take place. Conversely, when MEMEN is high, the counters 470 and 471 are not so connected, and control of the data bus DBUS is assumed by the memory or buffer module 472 so that digital data converted from analog form can be transmitted over DBUS.

In the preparation of the welding pulses for application to the element being welded, high energy capacitor module 201 is charged to a voltage level controlled by output VCH of the converter circuitry 215 (FIG. 8), the output VCH being applied through an offset gain amplifier 396 (FIG. 7) to a serial regulator formed by integrated circuit element 398, transistors 391 and 392, resistors 377–380 and capacitor 351 (FIG. 7). The output VC of the serial regulator is provided to the power switch driver module 219 of FIG. 5 wherein it is used to charge the capacitor module 201. As soon as the capacitor charging voltage reaches a preset value, voltage comparator 397 (FIG. 7) is activated so as to change the level of signal EOC (inverted) to low, thus starting the timer 670 (FIG. 10) and, after a short delay (preferably 200 milliseconds), the signal EOCD (inverted) at the output of timer 670 changes to a low level. Variation in the signal EOCD (inverted) activates monostable device 604 (FIG. 10). Monostable device 604 provides an output to NAND gate 635 which, together with inverters 656, 659 and 660, forms output GDI (inverted). Signal GDI (inverted) is used by NAND gate 764 of FIG. 13 to form output GD, the latter being provided to power switch driver module 219. Module 219 uses input GD to form a one-millisecond pulse which is amplified by transistors 252 and 240 to form signal GDOUT which is used to enable SCR 207. As previously mentioned, SCR 207, once enabled, closes the circuit between capacitor module 201 and the tool 204, and the welding pulse is applied.

The output pulse formed by monostable device 604 is also used to switch off the capacitor charging module 212 of FIG. 7. Specifically, monostable device 604 provides its output to NAND gate 635 which, together with NOR gate 646 and inverter 658, generates output CHRGONI (inverted). The latter signal is provided to interface circuitry 218c of FIG. 13, wherein NAND gate 765 and inverter 792 form output CHRGON (inverted). The latter signal is, in turn, provided to capacitor charging module 212 of FIG. 7, wherein it is applied via transistor 390 to integrated circuit element 398 so as to switch off the capacitor charging module 212 (a high level of input CHRGON (inverted) turns off the capacitor charging module 212).

The output pulse formed by monostable device 604 of FIG. 10 is provided to NAND gate 635 which, acting via inverter 656, toggles the T ports of flip-flops 605–608 on the leading edge of the pulse, thus turning off flip-flop 605 and turning on flip-flop 606 so as to move to the next welding sequence. Then, if the operator selects the second pulse by operation of switch P2 within the bank of switches 305 of FIG. 11, the output signal START of FIG. 11 provided to device 603 of FIG. 10 will cause commencement of the second welding sequence as controlled by the output T2 of flip-flop 606 in the manner already discussed above with respect to the first welding sequence as controlled by the output T1 of flip-flop 605. Once the second pulse sequence is deactivated by the operator's placing switch P2 in the bank of switches 305 of FIG. 11 in an open status, a new leadign edge of output START will rise at the output of NAND gate 762, creating a further toggle pulse provided via elements 603, 635 and 656 of FIG. 10 to the T inputs of flip-flops 605–608, turning off flip-flop 606 and turning on flip-flop 607 so as to activate the third welding sequence. The third welding sequence or cycle will be carried out in the same manner as described above with respect to the first and second welding sequences. When the third welding sequence is exhausted, the flip-flops 605–608 are once again toggled by elements 603, 635 and 656 of FIG. 10 so that flip-flop 607 is turned off and flip-flop 608 is turned on. The output T4 of flip-flop 608 switches off the welding sequence by changing the state of the input to the A port of timer 610, thus reducing the base-timing sequence (15 seconds) to a very short timer interval, the output Q of timer 610 acting through inverter 655 to return the output ONCYC to a low condition, at which point the welding machine 200 of FIG. 4A assumes a "rest" condition and is ready for a new welding cycle.

As discussed above, in the manual mode of operation, the writing of a tested welding sequence to memory is achieved by selecting the manual mode of operation via remote control switch 302 of FIG. 4A and 11, and by activating the welding sequence using the WRITE START push-button 309 instead of the foot-operated switch 206 of FIG. 4B. As soon as button 309 of FIG. 11 is depresed, NAND gate 755 provides a high level at output WRTSTR. Referring to FIG. 9, presuming that the machine 200 is in "rest" condition so that signal ONCYC is low, monostable device 555 of FIG. 9 is turned on, forming the WRTCK signal (a pulse of 200 milliseconds duration) at its Q (inverted) output. At the same time, turning off the monostable device 555 results in a high Q output thereof, the latter output being provided together with a low MEM input (MEM is low in the manual mode) to the NOR gate 511, resulting in the provision of an enable input to the memory device 558. If the memory location selected using switches 308 of FIG. 11 is empty, memory device 558, 559, 502 of FIG. 9 provides a low MEMCK signal which operates, via NOR gate 510, to change the input to the J port of flip-flop 556 to a high level. At the end of the WRTCK pulse issued by monostable device 555, flip-flop 556 will turn on, thus turning on the WRTEN (write enable) signal which enables the subsequent memory writing activity to take place. Otherwise, the welding cycle will run normally as described above, that is, without writing to memory. In the meantime, the WRTCK (inverted) signal from monostable device 555 is applied to one input of NAND gate 760 in FIG. 11 and is used by NAND gates 760–762 to form the START (start welding) signal, thus activating the sequence of welding described above.

Returning to FIG. 9, if flip-flop 556 issues a high WRTEN output, a memory writing pulse is formed by the Q output of monostable device 557 at the end of each welding pulse when the EOCD (inverted) signal changes state (inverted EOCD is formed by device 670 of FIG. 10 and is provided to the second input of AND gate 501, the first input thereof receiving teh Q output of flip-flop 556). In this manner, the memory device 558 of FIG. 9 is enabled, and the contents of the data bus DBUS are written into the memory location in device 559 as selected by switches 308 of FIGS. 4A and 11, as well as by outputs T2 and T3 of flip-flop 606 and 607, respectively, in FIG. 10 (a different memory location is used for each of the welding pulses).

As previously described, memory-based welding operation is achieved when the mode control switch 302 of FIGS. 4A and 11 is in the "memory" position. Memory mode of operation follows the sequence described for manual mode of operation except for the fact that the MEM output of FIG. 11 is high level. Accordingly, digital memory unit 216 is in the "read" mode of operation since the memory device 558 is enabled for reading by the presence of a low input on its CE (inverted) or "negate chip enable" inut, the latter receiving the MEM signal via NOR gate 511. In addition, converter circuitry 215 of FIG. 8 is set by the MEMEN output of FIG. 9 to convert an 8-bit digital signal on DBUS (FIG. 8) to an analog control signal VCH which, in turn, controls the end-of-charge level on high energy capacitor module 201 (FIG. 5).

For each selected welding pulse, the desired charge level is "read" from a location in memory 558 of FIG. 9 as selected by switches 308 of FIGS. 4A and 11, the outputs of these switches being provided to FIG. 9 by ABUS, and also as dictated by timing signals T2 and T3 provided as outputs by flip-flops 606 and 607 of FIG. 10. If one of the selected memory locations is found to be empty, the welding sequence is quickly reset to the "rest" status by placing a low signal on the MEMCK output of AND gate 502 of FIG. 9, the MEMCK signal being provided in the memory mode of operation via NAND gates 637–639 to the "set" port of flip-flop 608. This, in turn, controls the timer 610.

Turning to consideration of the remote mode of operation, when a proper interface connector is mated with the connector 220 of FIG. 13, signal EXT-MODE (inverted) is internally grounded and the control of the machine 200 of FIG. 4A is passed to the external controller (not shown). Further referring to FIG. 13, signal EXTMODEB (inverted) is changed to a low level via inverters 790 and 791, and the following results are achieved. The NAND gate 503 of FIG. 9 forces the MEMEN output to go low, and this forces the converter circuitry 215 of FIG. 8 into the DAC mode of operation (since the MEMEN signal is applied to device 472 of FIG. 8). Furthermore, the CE (inverted) input to memory 558, which is connected to NOR gate 511, goes low, disabling memory 558. In addition, the master reset (MR) input of timer 610 of FIG. 10 is forced to a low level via NOR gates 647, thus precluding any possibility of starting the welding sequence via the generation of a START output by means of operation of the control panel 202 (FIG. 11). Finally, the three-state buffer 795 of FIG. 13 is enabled by output EXTMODEB (inverted) from inverter 791 so as to connect the bus DBUS to the external data bus EXTCHRGLCBUS of FIG. 13. As long as the welding machine 200 is in the remote mode of operation, the only way in which to activate welding pulses is by use of the external control signals, as described above.

The above disclosure includes only some preferred embodiments of the present invention. It is to be understood that changes and modifications within the capability of one of ordinary skill in the art may be introduced without departing from the spirit and scope of the disclosure of the claimed subject matter. In particular, it should be noted that the digital memory 216 is not limited to an integrated circuit device such as a ROM, PROM, or TAM. Any digital memory capaqble of performing the functions of digital memory 216, as described above, can be used without departing from the spirit and scope of this disclosure.

I claim:

1. A dental welding system for welding a dental element in accordance with a multi-pulse welding sequence while simultaneously storing the multi-pulse welding sequence for subsequent reapplication, said system comprising:

setting means operable by a user of the system for setting the multi-pulse welding sequence to be employed in welding the dental element;

generating means for generating the multi-pulse welding sequence set by said setting means so as to weld the dental element;

memory means for storing the multi-pulse welding sequence generated by said generating means; and control means connected between said setting means, on the one hand, and said generating means and said memory means, on the other hand, and operable by the user for storing the multi-pulse welding sequence in said memory means and for simultaneously providing the multi-pulse welding sequence to said generating means.

2. The system of claim 1, wherein said memory means stores a plurality of different multi-pulse welding sequences.

3. The system of claim 1, wherein said generating means comprises a control module responsive to the multipulse welding sequence set by said setting means for providing control signals, a charging module responsive to the control signals from said control module for developing an electrical charge in accordance therewith, and a power switch for providing the electrical charge developed by said charging module to a welding tool for welding the dental element.

4. The system of claim 1, further comprising interface means connected to said setting means and responsive to the multi-pulse welding sequence set by said setting means for providing corresponding welding pulse data, and converting means connected to said interface means for converting the welding pulse data to digital pulse data, the digital pulse data comprising the data corresponding to the multi-pulse welding sequence stored in said memory means.

5. The system of claim 1, wherein said memory means permanently stores the multi-pulse welding sequence so that the the multi-pulse welding sequence is not lost during power loss conditions.

6. The system of claim 1, further comprising retrieving means operable by the user for retrieving the multipulse welding sequence stored in said memory means for repeated provision to said generating means.

7. The system of claim 6, further comprising address selection means operable by the user for selecting locations in said memory means from which the multi-pulse welding sequence is to be retrieved by said retrieving means.

8. The system of claim 6, wherein said retrieving means comprises a digital-to-analog converter for converting the multi-pulse welding sequence from said memory means to analog pulse data for provision to said generating means.

9. The system of claim 1, wherein said setting means comprises at least one of pulse-on switches and pulse level controls.

10. The system of claim 1, further comprising address selection means operable by the user for selecting locations in said memory means where the multi-pulse welding sequence is to be stored.

11. The system of claim 1, wherein said generating means comprises a battery module which permits operation of the system in full insulation from conventional main power lines, thus providing for human safety during operation.

12. A multi-mode dental welding system for welding a dental element in accordance with a multi-pulse welding sequence, said system comprising:

mode selection means operable by a user of the system for selecting a first mode wherein the multi-pulse welding sequence is entered, stored and tested in a single operation, and for selecting a second mode wherein the user enters address information defining a storage location of the multi-pulse welding sequence;

input means for entering the multi-pulse welding sequence in the first mode;

memory means having storage locations for storing the multi-pulse welding sequence;

address selection means operable by the user in the second mode for entering the address information defining the storage location in said memory means of the multipulse welding sequence; and welding means for welding the dental element in accordance with the multi-pulse welding sequence entered via said input means in the first mode and defined by the address information entered via the address selection means in the second mode.

13. The system of claim 12, wherein the multi-pulse welding sequence entered by the user in the first mode is simultaneously stored in said memory means and used for test welding by said welding means, said address selection means being operable by the user in the first mode for defining the storage location in said memory means where the multi-pulse welding sequence is to be stored.

14. The system of claim 12, wherein said welding means comprises a battery module which permits operation of the system in full insulation from conventional main power lines, thus providing for human safety during operation.

15. A multi-mode dental welding system for welding a dental element in accordance with a multi-pulse welding sequence, said system comprising:

mode selection means operable by a user of the system for selecting a first mode wherein the multi-pulse welding sequence is entered, stored and tested in a single operation, and for selecting a second mode wherein the multi-pulse welding sequence is provided by an external source;

input means for entering the multi-pulse welding sequence in the first mode;

interface means connecting the external source to said system for conveying the multi-pulse welding sequence from the external source in the second mode; and welding means for welding the dental element in accordance with the multi-pulse welding sequence entered via said input means in the first mode and conveyed via said interface means in the second mode.

16. The system of claim 15, further comprising memory means having storage locations for storing the multi-pulse welding sequence, wherein the multi-pulse welding sequence entered via said inut means in the first mode is provided simultaneously to said memory means for storage and to said welding means for test welding.

17. The system of claim 16, further comprising address selection means operable by the user during the first mode for selecting the storage location in said memory means where the multi-pulse welding sequence is to be stored.

18. The system of claim 16, further comprising address selection means operable by the user for defining a storage location in said memory means containing a desired multi-pulse welding sequence, and output means connected to said memory means and responsive to the selection of the storage location by the user for reading the desired multi-pulse welding sequence from said memory means and providing the desired multi-pulse welding sequence to said welding means.

19. The system of claim 15, wherein said welding means comprises a batter module which permits operation of the system in full insulation from conventional main power lines, thus providing for human safety during operation.

* * * * *